(12) United States Patent
Schramm et al.

(10) Patent No.: US 7,966,408 B2
(45) Date of Patent: Jun. 21, 2011

(54) ADAPTIVE MULTIMEDIA INTEGRATION LANGUAGE (AMIL) FOR ADAPTIVE MULTIMEDIA APPLICATIONS AND PRESENTATIONS

(75) Inventors: Oliver Schramm, Wolfschlugen (DE); Klaus Röhrle, Stuttgart (DE)

(73) Assignee: Sony Deutschland GmbH, Cologne (DE)

( * ) Notice: Subject to any disclaimer, the term of this patent is extended or adjusted under 35 U.S.C. 154(b) by 1665 days.

(21) Appl. No.: 10/529,085
(22) PCT Filed: Sep. 16, 2003
(86) PCT No.: PCT/EP03/10291
§ 371 (c)(1),
(2), (4) Date: Mar. 24, 2005
(87) PCT Pub. No.: WO2004/029829
PCT Pub. Date: Apr. 8, 2004

(65) Prior Publication Data
US 2006/0031749 A1    Feb. 9, 2006

(30) Foreign Application Priority Data

Sep. 27, 2002   (EP) ..................................... 02021908

(51) Int. Cl.
*G06F 17/21* (2006.01)
(52) U.S. Cl. ......... 709/228; 709/226; 709/227; 715/500
(58) Field of Classification Search ................... 709/228
See application file for complete search history.

(56) References Cited

U.S. PATENT DOCUMENTS 6,693,652 B1 *  2/2004  Barrus et al. .................. 715/838
(Continued)

FOREIGN PATENT DOCUMENTS
EP        1 117 230       7/2001
(Continued)

OTHER PUBLICATIONS

Lioyd Rutlege, SMIL 2.0 "XML for Web Multimedia", Sep. 2001, pp. 78-84.*

(Continued)

*Primary Examiner* — Kenny S Lin
*Assistant Examiner* — Sulaiman Nooristany
(74) *Attorney, Agent, or Firm* — Oblon, Spivak, McClelland, Maier & Neustadt, L.L.P.

(57) ABSTRACT

The invention generally relates to the field of markup languages used to describe adaptive mobile multimedia applications and/or presentations being inherently dependent on the dynamic mobile environment they are running in, which means that these mobile multimedia applications and/or presentations need to be adapted to the preferences of mobile users, the capabilities of their mobile computing devices, and their current situation. It allows adaptive mobile stream-based multimedia applications with real-time requirements in a typical wireless scenario (e.g. a radio link with a changing transmission quality and hand-over procedures) to adaptively and responsively react to a time-varying network topology and different radio link characteristics. Thereby, the underlying invention especially includes research and development issues in the field of describing adaptation possibilities (1500), adaptation constraints (802) and adaptation events (3802) directed to a personalization and context-aware adaptation of document-based multimedia applications by providing methods for pre-allocating, reserving, monitoring and adapting QoS-related parameters in a dynamic mobile environment using an XML-based multimedia presentation language.
In this connection, a document model (100) consisting of vocabulary, document structure and linking means (1600) between the document model elements is presented which supports the description (700) of adaptive mobile multimedia applications and/or presentations. Besides, a document object model supporting a simplified transaction-oriented access is proposed.

27 Claims, 41 Drawing Sheets

U.S. PATENT DOCUMENTS

| | | | | |
|---|---|---|---|---|
| 7,058,802 | B1 * | 6/2006 | Epstein et al. | 713/150 |
| 7,376,932 | B2 * | 5/2008 | Chen et al. | 717/106 |
| 2004/0019900 | A1 * | 1/2004 | Knightbridge et al. | 725/23 |

FOREIGN PATENT DOCUMENTS

| | | |
|---|---|---|
| EP | 1 317 109 A1 | 6/2003 |
| EP | 1 327 940 A1 | 7/2003 |

OTHER PUBLICATIONS

Takeshi Yoshimura1, Mobile Streaming Media CDN Enabled by Dynamic SMIL, May 2002, pp. 651-661.*

Rutledge L: "SMIL 2.0: XML for Web multimedia" IEEE Internet Computing, IEEE Service Center, Piscataway, NJ, US, vol. 5, No. 5, Sep. 2001, pp. 78-84, XP002214117.

Rousseau F et al: "User adaptable multimedia presentations for the World Wide Web" Computer Networks, Elsevier Science Publishers B.V., Amsterdam, NL, vol. 31, No. 11-16, May 17, 1999, pp. 1273-1290, XP004304554.

Huang C-M et al: "An ODA-Like Multimedia Document System" Software Practice & Experience, John Wiley & Sons Ltd. Chichester, GB, vol. 26, No. 10, Oct. 1, 1996, pp. 1097-1126, XP000655599.

Editor: David C. Fallside, "XML Schema Part 0: Primer", W3C Recommendation, May 2, 2001, pp. 1-56.

Editor: Aaron Cohen, et al., "The SMIL 2.0 Layout Modules", pp. 1-26.

Editor: Tim Bray, et al., "Extensible Markup Language (XML) 1.0 (Second Edition)", W3C Recommendation Oct. 6, 2000, pp. 1-32.

Editor: Jeff Ayars, et al., "Synchronized Multimedia Integration Language (SMIL 2.0)", W3C Recommendation Aug. 7, 2001, pp. 1-247.

Editor: Murray Altheim, et al., "Modularization of XHTML™", W3C Recommendation Apr. 10, 2001, pp. 1-177.

Kutscher, et al., "Session Description and Capability Negotiation draft-ietf-mmusic-sdpng-03.txt", Network Working Group, Internet-Draft, TZI, Universitaet Bremen, Nov. 21, 2001, pp. 1-62.

"VoxML Markup Language", Technology Reports, Jan. 4, 2001, pp. 1-4.

Steven Pemberton, et al., "XHTML™ 1.0 The Extensible HyperText Markup Language (Second Edition)", A Reformulation of HTML 4 in XML 1.0, W3C Recommendation Jan. 26, 2000, revised Aug. 1, 2002, pp. 1-19.

Stephan Bugaj, et al., "Synchronized Multimedia Integration Language (SMIL) 1.0 Specification", W3C Recommendation Jun. 15, 1998, 31 pages.

Susanne Boll, et al., "ZyX—A Semantic Model for Multimedia Documents and Presentations", Proceedings of the 8$^{th}$ IFIP Conference on Data Semantics (DS-8): "Semantic Issues in Multimedia Systems", Jan. 5-8, 1999, pp. 1-20.

Editor: Ora Lassila,et al., "Resource Description Framework (RDF) Model and Syntax Specification", Rec-rdf-syntax-19990222, W3C Recommendation Feb. 22, 1999, pp. 1-42.

"Press Release (Singapore)", Multimedia and Hypermedia information coding Expert Group (MHEG), WG12 Convenor, Mar. 2001, pp. 1-2.

Editor: Tim Bray, et al., "Namespaces in XML", World Wide Web Consortium Jan. 14, 1999, Rec-xml-names-19990114, pp. 1-11.

"Document Object Model (DOM)", W3C, Architecture domain, Jan. 19, 2005, pp. 1-3.

"HyTime Users' Group Home Page", SGML Users' Group, Aug. 9, 2007, pp. 1-2.

* cited by examiner

FIG 3 (first part)

FIG 3 (second part)

```xml
                    minOccurs="0"

processContents="skip"/>

<!- -
                        further VoxML and other
                        Presentation Markup Languages
                        - ->
            </xs:all>
            <xs:attribute name="id" type="xs:ID" use="required"/>
            <xs:attribute name="type"
                            type="mediaitemAttributeTypeType"
use="required"/>
            <xs : attribute name="region" type="xs:IDREF"
use="required"/>
            <xs:attribute name="src" type="xs:anyURI"/>
          </xs:complexType>
        </xs:element>
      </xs:choice>
    </xs:complexType>

<xs:simpleType name="mediaitemAttributeTypeType">
        <xs:restriction base="xs:string">
            <xs:enumeration value="audio"/>
            <xs:enumeration value="video"/>
            <xs:enumeration value="image"/>
            <xs:enumeration value="text"/>
            <xs:enumeration value="slideshow"/>
            <xs:enumeration value="textticker"/>
        </xs:restriction>
    </xs:simpleType>
```

FIG 4 (first part)

FIG 4 (second part)

```
type="xs:anyURI"/>
                </xs:restriction>
              </xs:complexContent>
            </xs:complexType>
          </xs:element>
        </xs:sequence>
        <xs:attribute name="id" type="xs:ID" use="required"/>
        <xs:attribute name="type" type="xs:string"
                      use="required"/>
        <xs:attribute name="region" type="xs:IDREF"
                      use="required"/>
        <xs:attribute name="class" type="xs:string"
                      use="required"/>
        <xs:attribute name="src" type="xs:anyURI"
                      use="required"/>
      </xs:complexType>
    </xs:element>
  </xs:choice>
</xs:complexType>
```

FIG 8 (first part)

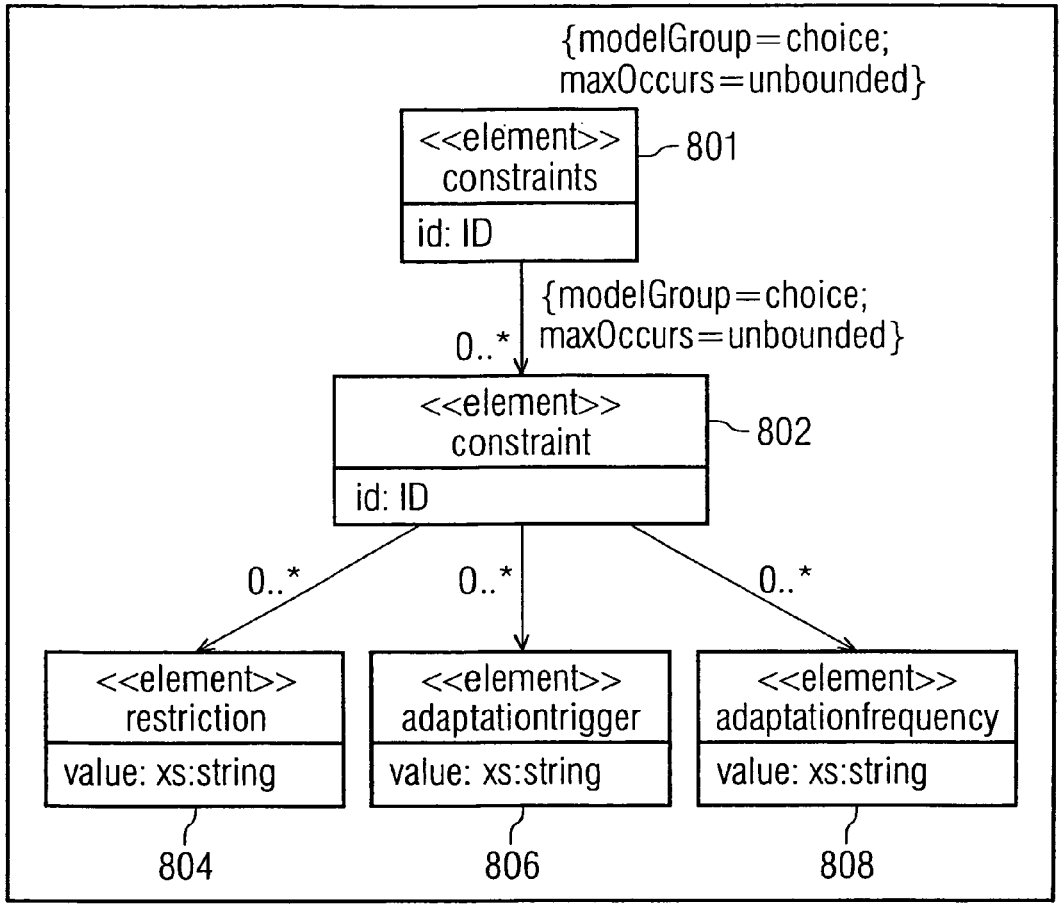

```
<xs:element name="constraints" type="constraintsType"/>

<xs:complexType name="constraintsType">
  <xs:choice maxOccurs="unbounded">
    <xs:element name="constraint">
    <xs:complexType>
     <xs:choice maxOccurs="unbounded">
      <xs:element name="restriction">
       <xs:complexType>
        <xs:complexContent>
         <xs:restriction base="xs:anyType">
          <xs:attribute name="value" type="xs:string"/>
         </xs:restriction>
        </xs:complexContent>
```

FIG 8 (second part)

```
</xs:complexType>
        </xs:element>
        <xs:element name="adaptationtrigger">

<xs:complexType>
            <xs:complexContent>
              <xs:restriction base="xs:anyType">
                <xs:attribute name="value"
type="xs:string"/>
              </xs:restriction>
            </xs:complexContent>
          </xs:complexType>
        </xs:element>
        <xs:element name="adaptationfrequency">
          <xs:complexType>
            <xs:complexContent>
              <xs:restriction base="xs:anyType">
                <xs:attribute name="value"
type="xs:string"/>
              </xs:restriction>
            </xs:complexContent>
          </xs:complexType>
        </xs:element>
      </xs:choice>
    </xs:complexType>
  </xs:choice>
</xs:complexType>
```

FIG 11 (first part)

| Name | Description | Value range | Units | applies to |
|---|---|---|---|---|
| framerate | Restricts the frame rate to use for mediaitems of type "video". | positive integer | frames/s | mediaitem |
| samplingrate | Restricts the sampling rate for mediaitems of type "audio". | positive integer | | mediaitem |
| bitsperpixel | Restricts the color depths for mediaitems of type "video" or "image". | positive integer | | mediaitem |
| quality | Restricts the media quality to use. This setting can be interpreted differently depending on the used codec for the media item. | float between 0 and 1 | | mediaitem |
| bitrate | Restricts the bit rate to use. | positive integer | kBit/s MBit/s | all |
| bitratetoADDRESS | Restricts the bit rate for a specific target host. ADDRESS can be an IP address or a hostname. | positive integer | kBit/s MBit/s | all |
| memory | Limits the amount of memory to use. | positive integer | Bit kBit | all |

FIG 11 (second part)

| Name | Description | Value range | Units | applies to |
|---|---|---|---|---|
| cpu | Restricts the amount of processing power to use. Either specified in the load percentage or an normalized processing power value. | positive integer | % | all |
| audioquantity | Restricts the number of media items of type audio. | positive integer | | all except mediaitem |
| videoquantity | Restricts the number of media items of type video. | positive integer | | all except mediaitem |
| textquantity | Restricts the number of media items of type text. | positive integer | | all except mediaitem |
| imagequantity | Restricts the number of media items of type image. | positive integer | | all except mediaitem |
| discretequantity | Restricts the number of discrete media items. | positive integer | | all except mediaitem |
| contquantity | Restricts the number of continuous media items. | positive integer | | all except mediaitem |

FIG 12

| Name | Description | Value range | Units |
|---|---|---|---|
| framerate | Specifies framerate limits for media item of type "video". | positive integer | frames/s |
| bitrate | Specifies bitrate limits. | positive integer | |
| plr | Specifies limits for the packet loss rate. | positive integer | % |
| delay | Specifies limits for the delay. | positive integer | ms |
| jitter | Specifies limits for the jitter. | positive integer | % |

FIG 13       1300

```
<par>
  <choose priority="1">
    <mediaitem idref="M1"

priority="3"/>
    <mediaitem idref="M2"

priority="4"/>
  </choose>
  <choose>
    <mediaitem idref="M3"

priority="5"/>
    <mediaitem idref="M4"

priority="6"/>
  </choose>
</par>
```

AP 1: M4, M2 with priority 6-4
AP 2: M4, M1 with priority 6-3
AP 3: M3, M2 with priority 5-4
AP 4: M3, M1 with priority 5-3

FIG 16

```xml
<?xml version="1.0"?>

<amil>
  <head>
    <layout>
      <root-layout width="320" height="240" background-color="white"/>
      <region id="rA" left="0" top="0" width="320" height="120"/>
      <region id="rB" left="0" top="120" width="320" height="120"/>
    </layout>
    <mediaitems>
      <mediaitem id="mA" type="movie" region="rA"
              src="rtsp://mediaserver/media.mov"/>
    </mediaitems>
    <widgets>
      <widget id="widget" type="widget" region="rB"
            class="de.comcar.browser.widgets.SVGNavigation"
            src="http://webserver/SVGNavigation.jar">
        <param name="url" value="http://webserver/view.svg"/>
      </widget>
    </widgets>
  </head>
  <body>
    <adaptation>
      <mediaitem idref="mA"/>
    </adaptation>
  </body>
</amil>
```

1800

...
<xsl:test="diff(currentlocation, location ('47,11','9,34'))<500">
    <!-- do something -->
</xsl:test>
...

```xml
<events xmlns="http://www.sony.de/amil"
        xmlns:xsl="http://www.w3.org/1999/XSL/Format"
        xmlns:ev="http://www.w3.org/2001/xml-events">
  <ev:listener event="location::changeEvent">
    <action type="passToScript">
      <xsl:choose>
        <xsl:when
<xsl:test="diff(currentlocation, location ("47,11","9,34"))">
          <link>
            <src id="mediaitemA, regionA">
            <target id="mediaitemA, regionB">
          </link>
          <link>
            <element id="mediaitemB, regionB">
            <region id="mediaitemB, regionC">
          </link>
        </xsl:when>
        <xsl:otherwise>
          <link>
            <src id="mediaitemA, regionA">
            <target id="mediaitemA, regionC">
          </link>
        </xsl:otherwise>
      </xsl:choose>
    </action>
  </ev:listener>
</events>
```

```
<events xmlns="http://www.sony.de/amil"

xmlns:xsl="http://www.w3.org/1999/XSL/Format"
        xmlns:ev="http://www.w3.org/2001/xml-events">
   <ev:listener event="location::changeEvent">
     <action type="passToScript">
       <link>
         <src id="mediaitemA, regionA">
         <target id="mediaitemA, regionC">
       </link>
     </action>
   </ev:listener>
</events>
```

```
<par>
   <choose>
     <mediaitem idref="m1">
     <mediaitem idref="m2">
   </choose>
   <choose>
     <mediaitem idref="m3">
     <mediaitem idref="m4">
   </choose>
</par>
```

FIG 22 (first part)

2200

```
<body>

<constraints>
    <constraints id="low">
      <restriction value="bitrate > 100 kBit/s">
      <restriction value="bitrate < 1500 kBit/s or framerate > 30 frames/s">
      <restrictions value="cpu  < 40%">
    <constraint>
    <constraint id="mid">
      <restriction value="bitrate < 1000 kBit/s">
      <restriction value="cpu  < 30%">
    <constraint>
    <constraint id="high">
      <restriction value="bitrate < 500 kBit/s">
      <restriction value="cpu  < 20%">
    <constraint>
    <constraint id="video">
      <adaptationtrigger value="framerate < 15 frames/s">
      <adaptationtrigger value="plr  > 0,05">
    <constraint>
  </constraints>
```

FIG 22 (second part)

```
<adaptation>
  <choose idref="low">
    <mi id="medialtemA" idref="video"/>
    <mi id="medialtemB"/>
  </choose>
  <choose idref="mid">
    <mi id="medialtemC"/>
    <mi id="medialtemD"/>
  </choose>
  <choose idref="high">
    <mi id="medialtemE"/>
    <mi id="medialtemF"/>
  </choose>
<adaptation>

</body>
```

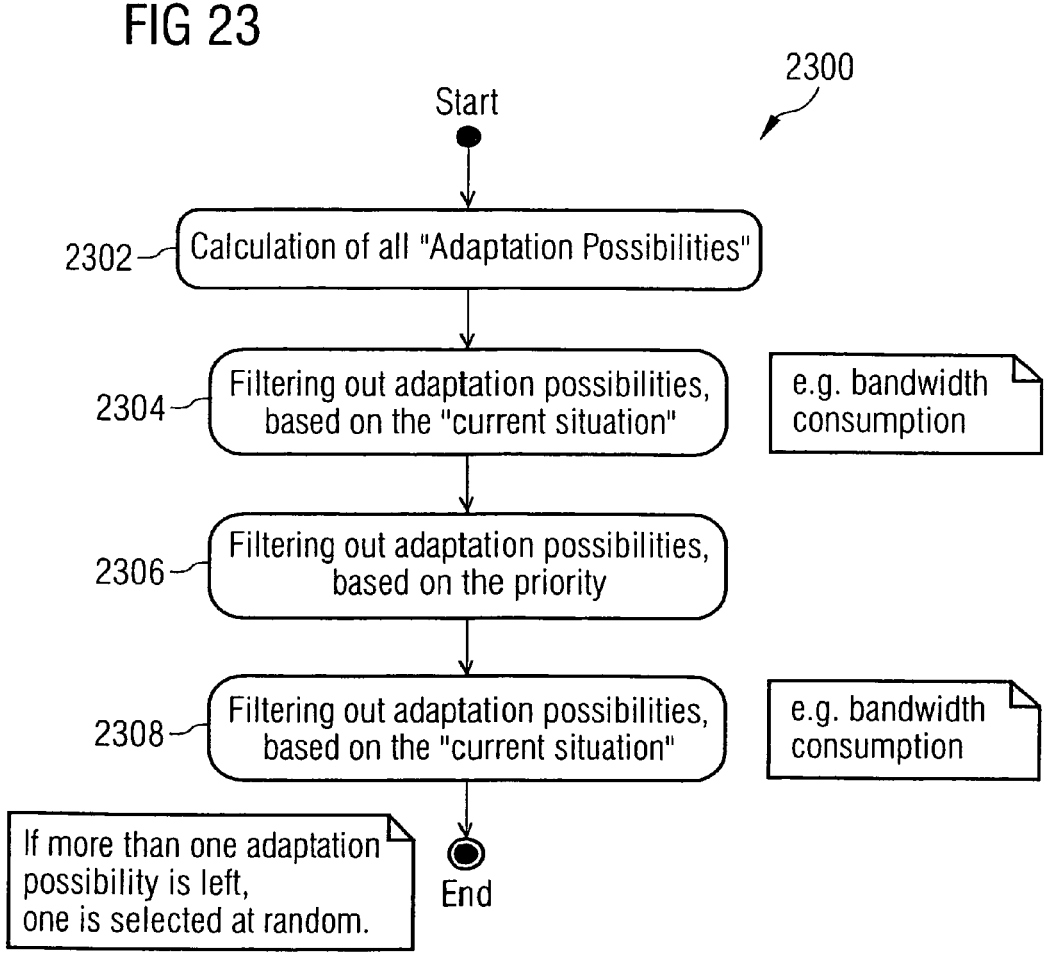

FIG 29 (first part)

FIG 29 (second part)

```
<xs:element name="adaptation" type="adaptationType">

<xs:complexType name="adaptationType">
  <xs:choice minOccurs="0" maxOccurs="unbounded">
    <xs:element name="choose" type="chooseType" />
    <xs:element name="par" type="parType" />
    <xs:element name="seq" type="seqType" />
    <xs:element name="mediaitem" type="mediaitemType" />
  </xs:choice>
  <xs:attribute name="id" type="xs:ID"/>
</xs:complexType>

<xs:complexType name="chooseType">
  <xs:choice minOccurs="0" maxOccurs="unbounded">
    <xs:element name="choose" type="chooseType"/>
    <xs:element name="par" type="parType" />
    <xs:element name="seq" type="seqType" />
    <xs:element name="mediaitem" type="mediaitemType" />
  </xs:choice>
  <xs:attribute name="priority" type="priorityType"/>
  <xs:attribute name="startmode" type="startmodeType"/>
  <xs:attribute name="starttime" type="starttimeType"/>
  <xs:attribute name="onremove" type="onremoveType"/>
  <xs:attribute name="looping" type="loopingType"/>
  <xs:attribute name="evaluation" type="evaluationType"/>
  <xs:attribute name="empty" type="emptyType"/>
</xs:complexType>
```

FIG 29 (third part)

```
<xs:complexType name="parType">
   <xs:choice minOccurs="0" maxOccurs="unbounded">
      <xs:element name="choose" type="chooseType"/>
      <xs:element name="par" type="parType" />
      <xs:element name="mediaitem" type="mediaitemType" />
   </xs:choice>

<xs:attribute name="priority" type="priorityType"/>
</xs:complexType>

<xs:complexType name="seqType">
   <xs:choice minOccurs="0" maxOccurs="unbounded">
      <xs:element name="choose" type="chooseType"/>
      <xs:element name="par" type="parType"/>
      <xs:element name="seq" type="seqType"/>
      <xs:element name="mediaitem" type="mediaitemType"/>
   </xs:choice>
   <xs:attribute name="priority" type="priorityType"/>
</xs:complexType>

<xs:complexType name="mediaitemType">
   <xs:complexContent>
      <xs:restriction base="xs:anyType">
         <xs:attribute name="idref" type="xs:IDREF" use="required" />
         <xs:attribute name="priority" type="priorityType"/>
         <xs:attribute name="starttime" type="starttimeType"/>
      </xs:restriction>
   </xs:complexContent>
</xs:complexType>
```

FIG 29 (fourth part)

```xml
<xs:simpleType name="startmodeType">
  <xs:restriction base="xs:string">
    <xs:enumeration value="restart"/>
    <xs:enumeration value="resume"/>
    <xs:enumeration value="laststop"/>
    <xs:enumeration value="playtime"/>
    <xs:enumeration value="contplaytime"/>
  </xs:restriction>
</xs:simpleType>

<xs:simpleType name="starttimeType">
  <xs:pattern value="\d{1}+s"/>
</xs:simpleType>

<xs:simpleType name="onremoveType">
  <xs:restriction base="xs:string">
    <xs:enumeration value="destroy"/>
    <xs:enumeration value="remove"/>
  </xs:restriction>
</xs:simpleType>

<xs:simpleType name="loopingType">
  <xs:restriction base="xs:boolean"/>
</xs:simpleType>

<xs:simpleType name="evaluationType">
  <xs:restriction base="xs:string">
    <xs:enumeration value="start-up"/>
    <xs:enumeration value="con"/>
```

FIG 29 (fifth part)

```
<!-- and integer values concluded with the unit "s" -->
  </xs:restriction>
</xs:simpleType>

<xs:simpleType name="emptyType">
  <xs:restriction base="xs:boolean"/>
</xs:simpleType>

<xs:simpleType name="priorityType">
  <xs:restriction base="xs:integer">
    <xs:minInclusive value="1"/>
    <xs:maxInclusive value="99"/>
  </xs:restriction>
</xs:simpleType>
```

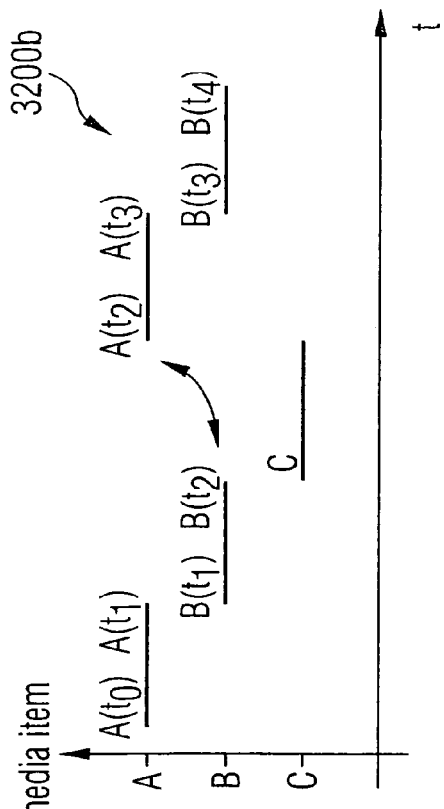
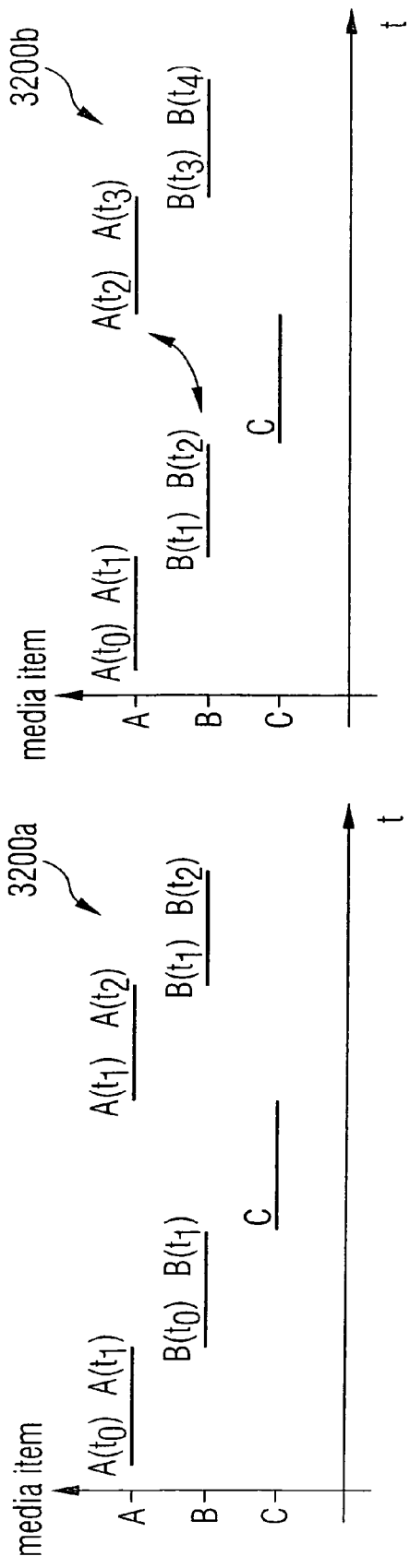

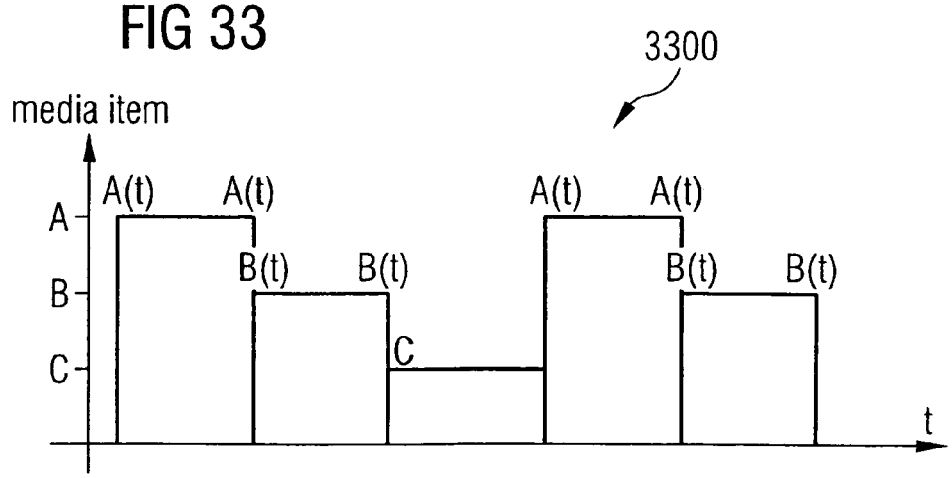
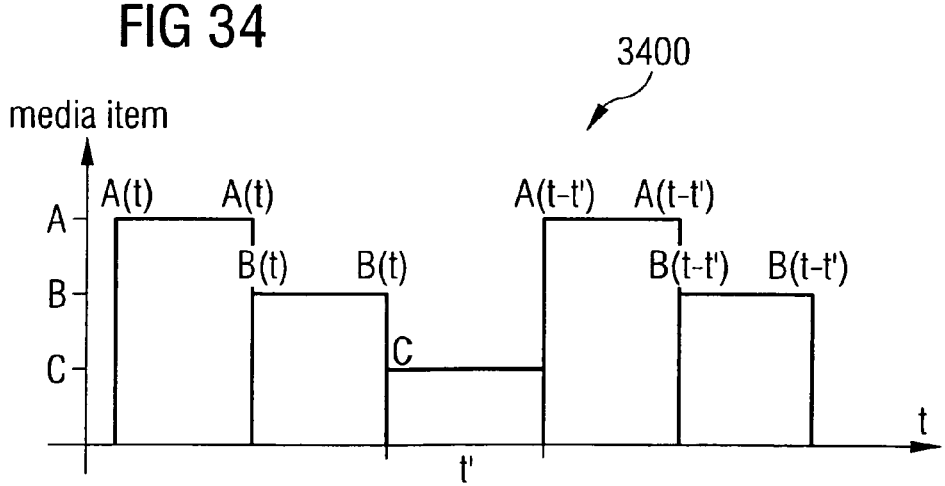

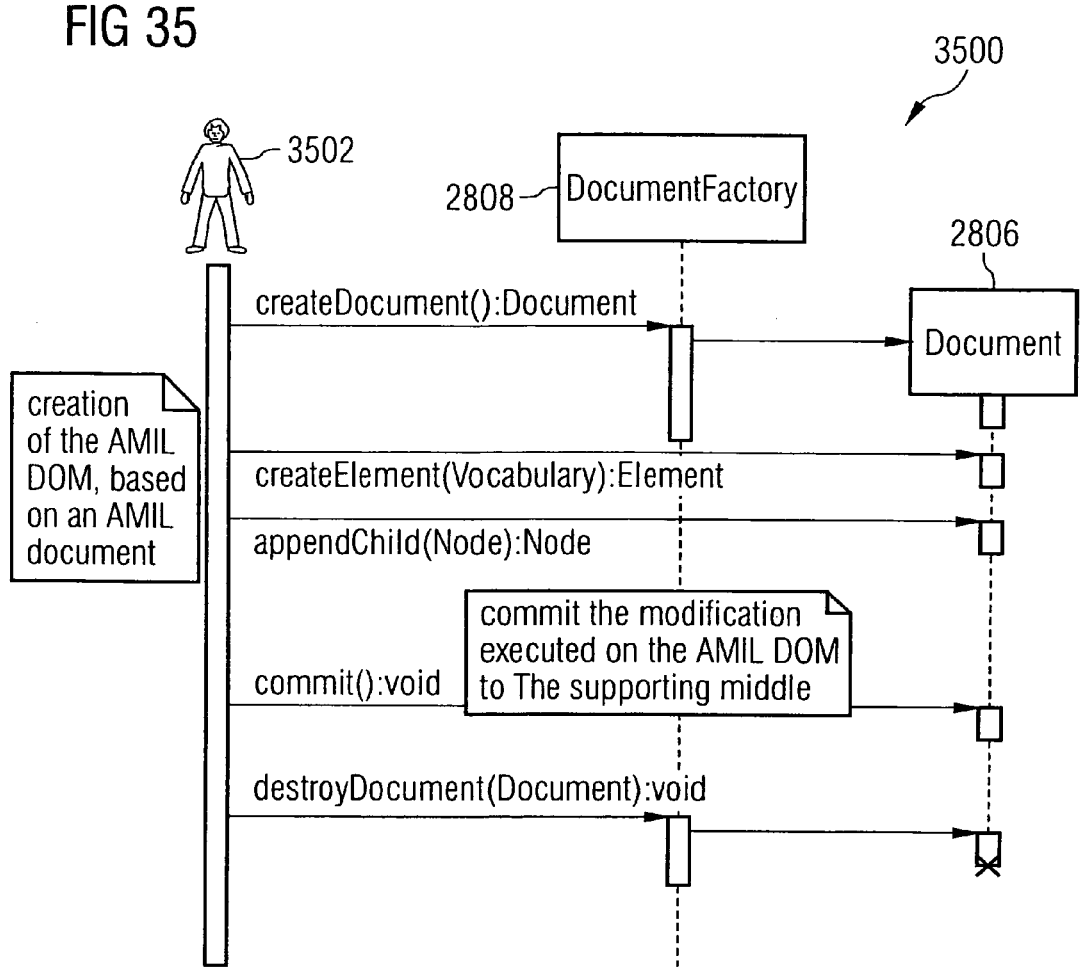

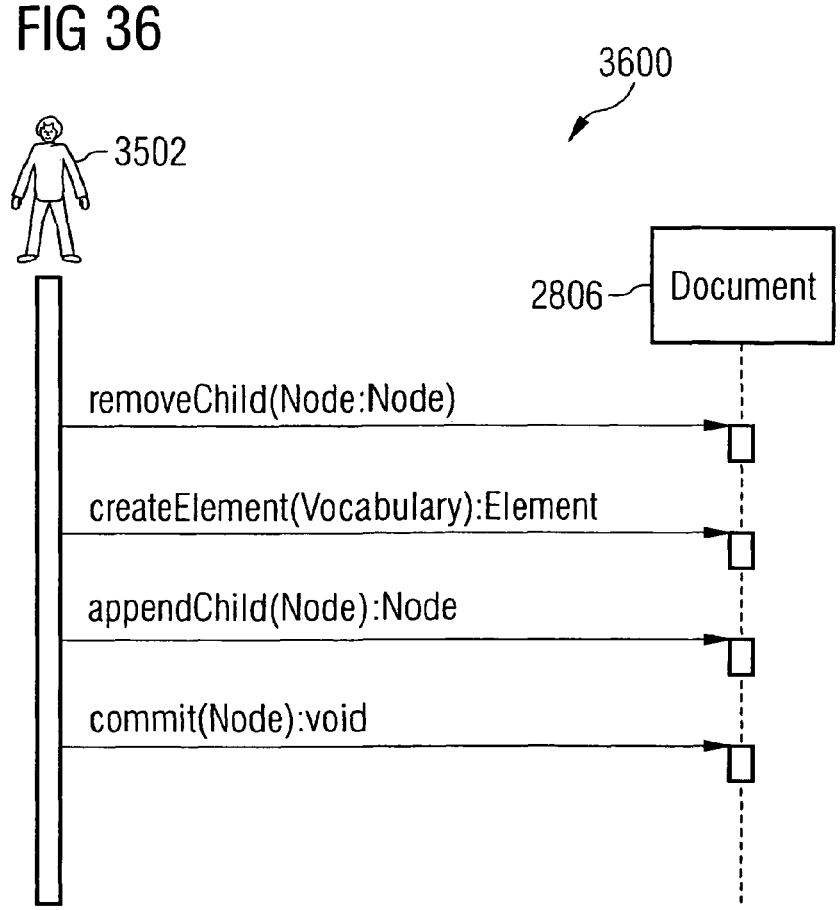

FIG 39 (first part)
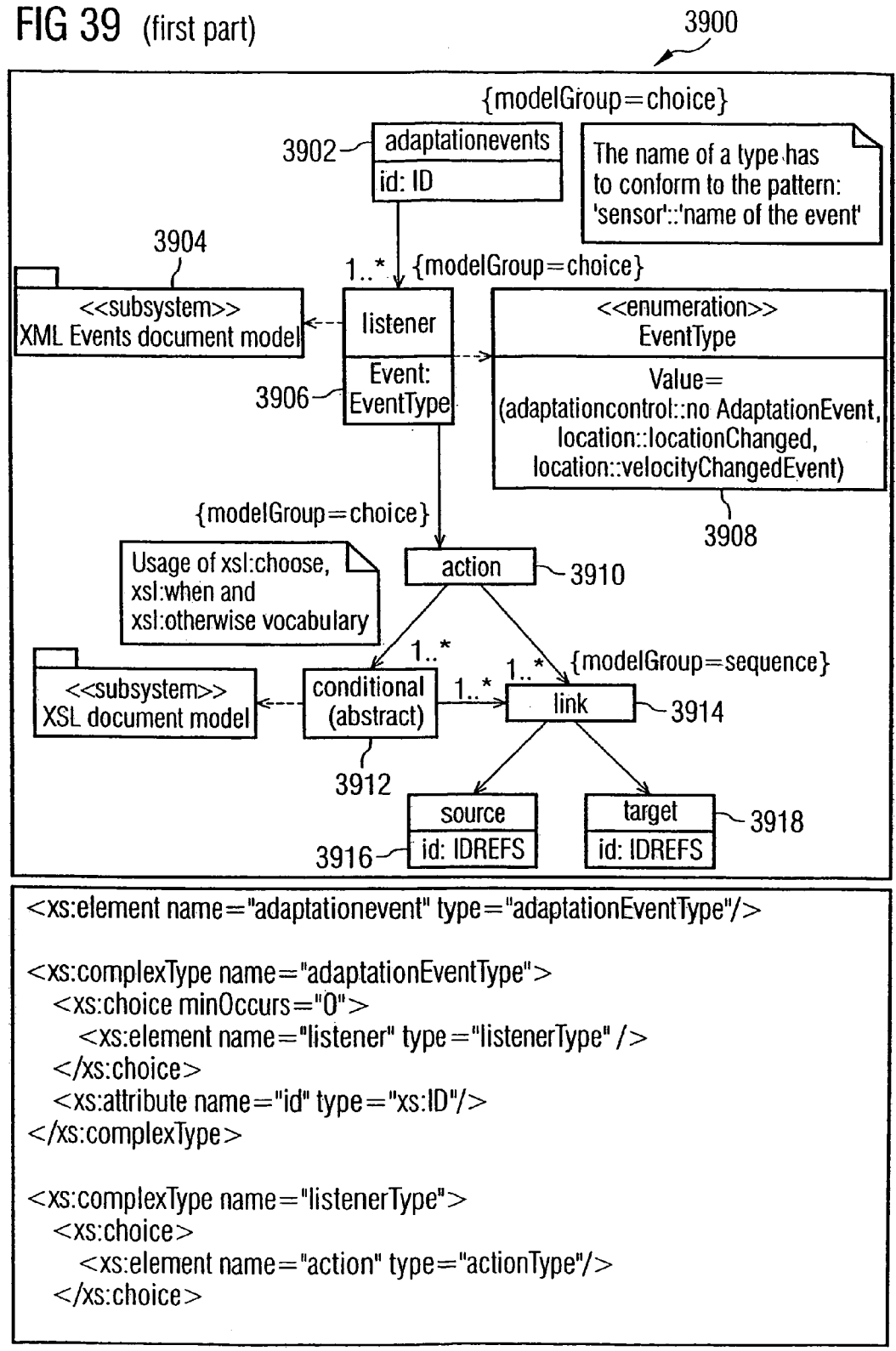

FIG 39 (second part)

```
<xs:complexType name="actionType">
    <xs:choice>
        <xs:element name="link" type="linkType"/>
    </xs:choice>
</xs:complexType>

<xs:complexType name="linkType">
    <xs:sequence>
        <xs:element name="source" type="sourceType"/>
        <xs:element name="target" type="targetType"/>
    </xs:sequence>
</xs:complexType>

<xs:complexType name="sourceType">
    <xsd:complexContent>
        <xsd:restriction base="xsd:anyType">
            <xsd:attribute name="refs" type="xsd:string"/>
        </xsd:restriction>
    </xsd:complexContent>
<xs:complexType>

<xs:complexType name="targetType">
    <xsd:complexContent>
        <xsd:restriction base="xsd:anyType">
            <xsd:attribute name="refs" type="xsd:string"/>
        </xsd:restriction>
    </xsd:complexContent>
<xs:complexType>
```

FIG 39 (third part)

```
<xs:simpleType name="eventType">
    <xs:restriction base="xs:string">
        <xs:enumeration value="adaptation::noAdaptationPossiblity"/>
        <xs:enumeration value="application::newMediaitem"/>
        <xs:enumeration value="location::velocityChangeEvent"/>
        <xs:enumeration value="location::locationChangeEvent"/>
    </xs:restriction>
</xs:simpleType>
```

FIG 40
(first part)

```
<?xml version="1.0"?>
<amil:amil
    xmlns:rdf="http://www.w3.org/TR/WD-rdf-syntax#"
    xmlns:amil="http://www.sony.de/amil"
    xmlns:xsi="http://www.w3.org/2001/XMLSchema-instance"
    xmlns:smil="http://www.w3.org/2001/SMIL20/WD/Layout Module"
    xmlns:svg="http://www.w3c.org/svg"
    xmlns:xhtml="http://www.w3.org/1999/xhtml" >
<amil:head module>
<amil:title>Example</amil:title>

<amil:layout>
    <smil:root-layout width="640" height="480" backgroundcolor="white"/>
    <smil:region id="upperpart" left="0" top="0" width="640" height="240"/>
    <smil:region id="middlepart" left="0" top="240" width="640" height="200"/>
    <smil:region id="lowerpart" left="100" top="440" width="440" height="40"/>
</amil:layout>

<amil:mediaitems>
    <amil:mediaitem id="mediaA-hg" type="movie" region="upperpart"
src="rtsp://mediaserver/centa/AKnightsTale-hq.mov"/>
    <amil:mediaitem id="mediaA-mq" type="movie" region="upperpart"
```

FIG 40 (second part)

```
src="rtsp://mediaserver/centa/AKnightsTale-mq.mov"/>
    <amil:mediaitem id="mediaA-lq" type="movie" region="upperpart"
src="rtsp://mediaserver/centa/AKnightsTale-lq.mov"/>
    <amil : mediaitem id="ad" type="text/xhtml" region="middlepart" >
        <xhtml>
            ...plain text in XHTML...
        </xhtml>
    </amil:mediaitem>
</amil:mediaitems>

<interactions>
    <widget id="widgetA" type="class" region="lowerpart" class="de.comcar.browser.widget.SmartWidget"/>
</interactions>
</amil:head module>

<amil:body module>
    <adaptation>
        <amil:mediaitem idref="ad"/>
        <amil:widget idref="widgetA"/>
        <choose>
            <amil:mediaitem idref="mediaA-hq"/>
            <amil:mediaitem idref="mediaA-mq"/>
            <amil:mediaitem idref="mediaA-lq"/>
        </choose>
    </adaptation>
</amil:body module>
</amil:amil>
```

ADAPTIVE MULTIMEDIA INTEGRATION LANGUAGE (AMIL) FOR ADAPTIVE MULTIMEDIA APPLICATIONS AND PRESENTATIONS

FIELD AND BACKGROUND OF THE INVENTION

The underlying invention generally relates to the field of markup languages used to describe adaptive mobile multimedia applications and/or presentations being inherently dependent on the continuously changing environment they are running in, which means that these mobile multimedia applications and/or presentations need to be adapted to the preferences of mobile users, the capabilities of their mobile computing devices, and the users physical impact like current location, time or temperature.

Applications running on mobile devices are experiencing a highly dynamic environment. They have to cope with inherent fluctuation of the available Quality of Service (QoS) in wireless networks, and they should be usable on a wide range of different devices. Additionally, for providing a good service, they should take the users' preferences and context into account, e.g. his current location. To meet those requirements, the developers of such applications need to be supported by a platform that allows applications to adapt to different networks, device and user situations, and which hides some of the complexity involved. Adaptive Multimedia Support Environment (AMUSE) is a platform, which supports adaptive distributed multimedia retrieval applications. The platform consists of three parts, a client-side middleware, a multimedia application built on top of the middleware, and a server-side context-aware mobile portal.

By contrast, the focus of the underlying invention is the document-based approach in the way that adaptive mobile applications and/or presentations are described with an XML-based document, generated by a server-side authoring system (represented by the context-aware mobile portal), processed and rendered by client-side middleware, capable of executing the processing of the XML-based document description.

There are different ways to realize multimedia applications. First, a multimedia application can be quite specific, implemented for a specifically defined scenario, and the application itself might be adjustable by a configuration file, which is quite good for a specific, narrowed scenario. The second way would be to describe a multimedia application in a document-based way and let a browser or player interpret the document, which is done e.g. in "Synchronized Multimedia Integration Language" (SMIL, cf. SMIL 2.0, W3C Recommendation, 7 Aug. 2001, http://www.w3.org/TR/smil20/), and is a more general approach. In the scope of the underlying invention, the latter has been applied. Thereby, multimedia document models such as Hypertext Markup Language (HTML), Dynamic HTML (DHTML), Multimedia and Hypermedia Information Coding Expert Group (MHEG, cf. International Organization for Standardization, ISO/IEC JTC1/SC29/WG12, http://www.mheg.org/), SMIL and HyTime (cf. Users' Group Home Page www.hytime.org) have been evaluated in order to use or extend their document models for describing adaptive multimedia applications. Unfortunately, these document models do not provide sufficient modeling support for adaptive applications. Adaptation is addressed to some extend once at start-up time of a multimedia application, but mobile adaptive multimedia applications have additional adaptation requirements owing to the inherent dynamic environment they are running in. Selecting appropriate streaming media at start-up time does not consider changes, like fluctuation of QoS in wireless network during the run-time of an application.

Applications running on mobile devices are experiencing a highly dynamic environment. The environmental changes can be categorized into three different dimensions: network QoS, mobile device capabilities, and user context. A mobile application has to cope with changes in all three dimensions. Thereby, the term "situation" is used for a given network QoS, mobile device capabilities and user context. A situation can be characterized by a set of parameters describing different aspects of the environment. The "current situation" is the situation, which exists at present for a mobile application. If the current situation causes a problem for the application or if it allows the application to improve its service, the application may change its behavior to better reflect said current situation. As this is true for all mobile applications, the situation is especially interesting when looking at multimedia applications, as those have very tough requirements, especially concerning Quality-of-Service (QoS) conditions of the applied network.

OBJECT OF THE UNDERLYING INVENTION

In view of the explanations mentioned above, it is the object of the invention to propose a technology supporting a personalization and context-aware adaptation of document-based mobile multimedia applications.

The multimedia applications can e.g. be retrieved from specific content providers via mobile networks to the preferences of mobile users, the capabilities of their mobile devices and different application scenarios.

This object is achieved by means of the features of the independent claims. Advantageous features are defined in the dependent claims. Further objects and advantages of the invention are apparent in the following detailed description.

BRIEF DESCRIPTION OF THE DRAWINGS

Further advantages and possible applications of the underlying invention will become evident from the following description of the preferred embodiment of the invention, which is depicted in the following drawings:

FIG. 11 shows a third table presenting the applied restriction identifier, FIG. 12 shows a fourth table presenting the applied adaptation trigger identifier, FIG. 13 shows an example for describing different adaptation possibilities (APs), FIG. 16 shows an example for the linking between the Adaptation Module and the MediaItems Module, between the MediaItems Module and the Layout Module, and between the Interactions Module and the Layout Module, FIG. 19 shows a first example for a document fragment of an adaptation event description, FIG. 20 shows a second example for a document fragment of an adaptation event description, FIG. 21 shows an example for different adaptation alternatives, FIG. 22 shows an example for the definition and usage of constraints, FIG. 23 presents a first activity diagram showing a process of determining different adaptation possibilities by using the applied AMIL DOM data structure, FIG. 39 shows an overview diagram of the Events Module supported by AMIL, which allows acting on changes of the current situation, and FIG. 40 shows an example of an AMIL document supporting the core modules.

DETAILED DESCRIPTION OF THE UNDERLYING INVENTION

Figure 1:
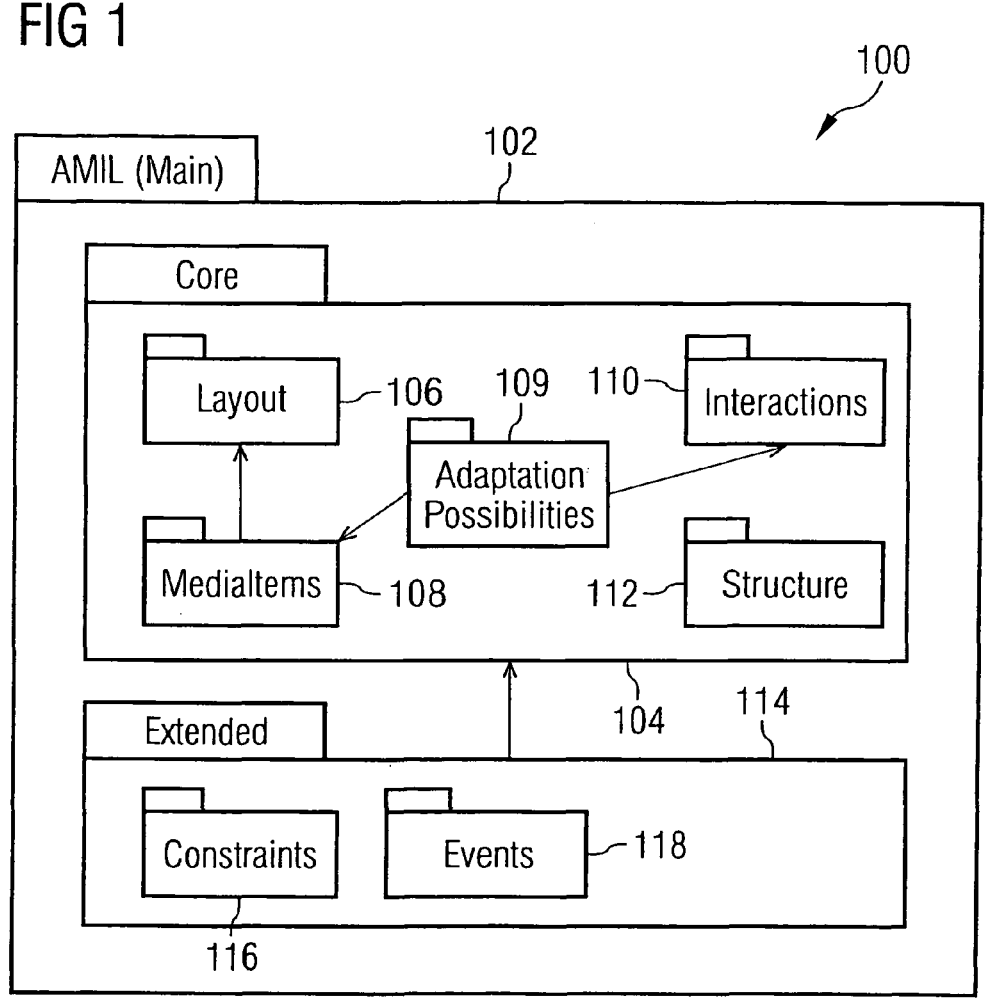
FIG. 1 presents a Structure Module according to one embodiment of the underlying invention.
Figure 2:
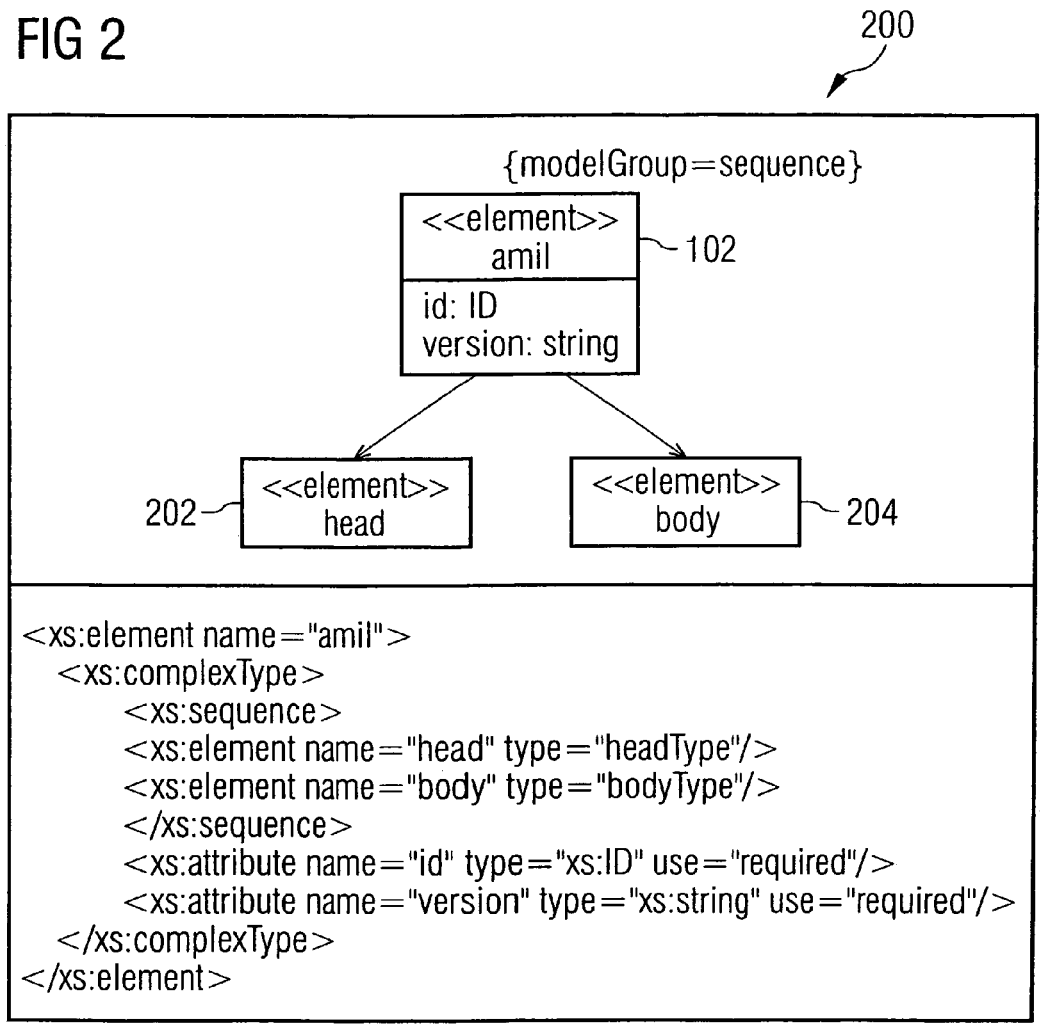
FIG. 2 presents a StructureModule according to an embodiment
Figure 3:
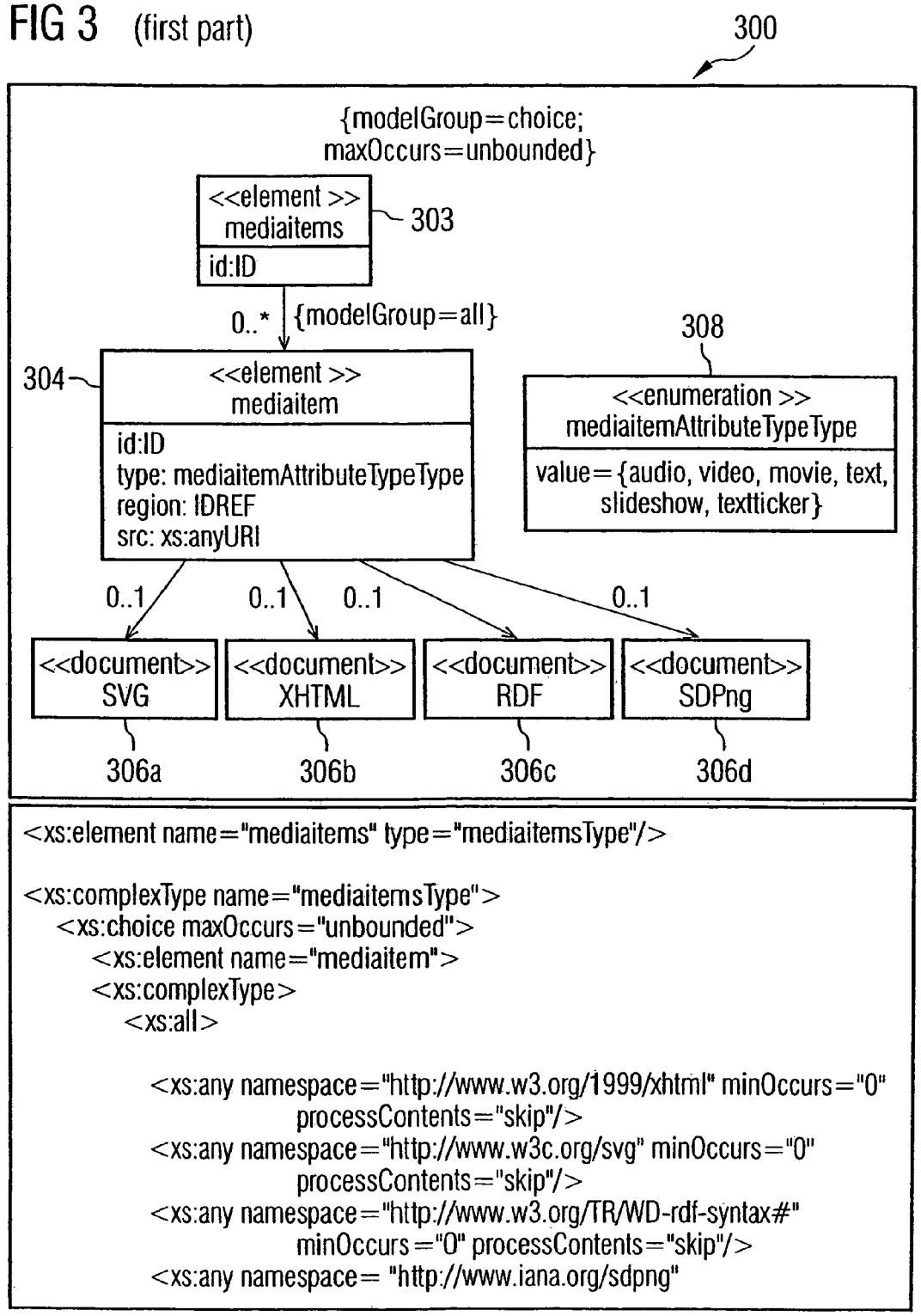
FIG. 3 presents a MediaItems Module according to one embodiment.
Figure 4:
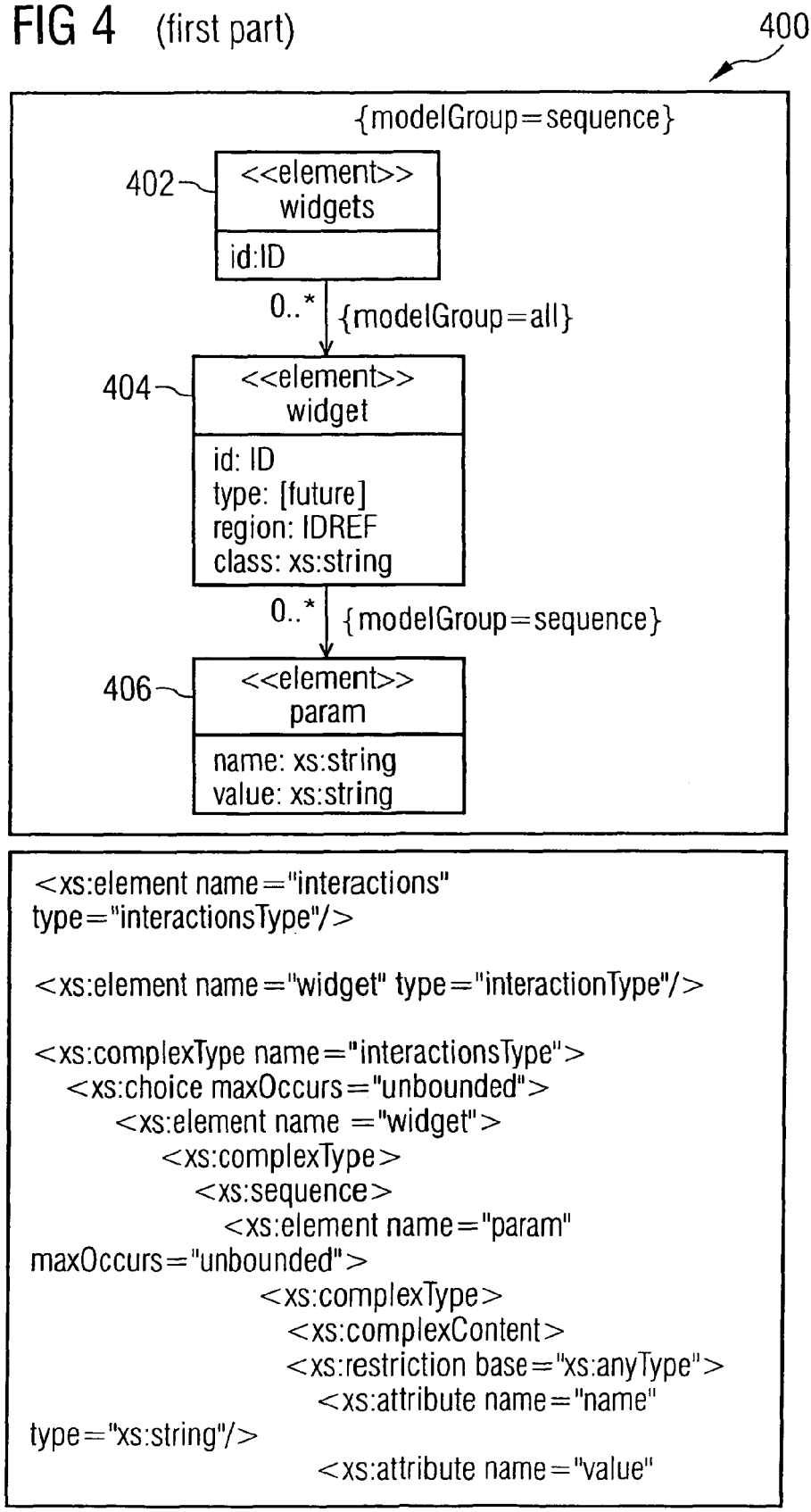
FIG. 4 presents an Interactions Module according to one embodiment.

In the following, the preferred embodiment of the underlying invention as depicted in FIGS. 1 to 40 shall be explained in detail. The meaning of the symbols designated with reference signs in FIGS. 1 to 40 can be taken from the annexed table.

First, the main concepts and characteristics of the new AMIL document model 100 shall be introduced.

As mentioned above, the AMUSE document model is invented due the fact that state-of-the-art document models do not, or only to some extend, consider the adaptation aspect in a way required if a document-based application runs in a highly dynamic environment.

The AMIL document model 100 is the link between a technique regarding the authoring process of a mobile adaptive multimedia application and an AMIL player, which is doing the processing of an AMIL document 2402. The AMIL player can be split up into two separate components—a browser and a supporting "client-side middleware". In the scope of the underlying invention, these expression are used in the following way: The browser, which is also named "Multimedia Browser", executes presentation related functions and user interaction 404; whereas the "client-side middleware" provides the functionality for executing the adaptation process.

In the following section, the AMIL document model 100 according to one embodiment of the underlying invention shall be explained. The document is concluded with several demonstrative examples.

Modules

The adaptive document model 100 can be split up into different modules according to their functionality. This enables the reuse of specific modules as an extension to other document models 100. The example 1700 depicted in FIG. 17 explains the reuse of complete AMIL documents. Relationships between these modules are realized by linking elements together. The AMIL document model 100 supports a "Main Module" 102, which simply serves as a container for all others modules. The "Main Module" 102 itself does not provide any further functionality; it serves logically as an overall aggregation/container module.

Each module is described in the following way: First, a table containing an Unified Modeling Language (UML) diagram and an Extensible Markup Language (XML) Schema description 700 is shown, and second, the meaning/semantic of each element and attribute is explained in detail. In case a clear separation to similar concepts is necessary, the differences are set down after the explanation of each element's or attribute's semantic.

It should be noted that, for describing the syntax, UML and XML Schemata are used. For describing XML in UML, UML's extensible mechanism (stereotypes, tagged values and constraints) was applied. Detailed information about this kind of modeling can be found in "Modeling XML Applications with UML. Practical e-Business Applications" (ISBN 0-201-70915-5) by D. Carlson.

AMIL (Main) and Core Modules

The "Core Module" 104 encompasses all module required in each AMIL document 2402. The Extension Module 114 can optionally be used for a more comprehensive description of the adaptation processes.

FIG. 1 gives a survey of the modules proposed by the AMIL document model 100. For modeling, UML "grouping things" are used. Thereby, every module is described by a "package" as described in "The Unified Modeling Language" (User Guide, ISBN 0-201-57168-4) by G. Booch, J. Rumbaugh, and I. Jacobson.

Note:

Each package logically "depends" (UML relationship "dependency") upon the "Structure Module" 112. This relationship is not shown in FIG. 1 but still exits.

The "Core Module" 104 and the "Extension Module" 114 are, like the "Main" Module 102, simply used for grouping.

1. AMIL Structure Module

The AMIL "Structure Module" 112 reflects the fundamental structure of an AMIL document 2402. Like XHTML, it splits up the document into two sections—a "head module" section 202 containing the declaration of the layout 3702, used media items 304, interactions 404, and e.g. constraints 802 as well as a "body module" section 204 focusing on the adaptation aspect where the intrinsic adaptation possibilities 1500 are described.

"amil" element:
  The "amil" element is the outermost element that contains all others. This element, according to the XML definition, can be preceded and followed by comments and processing instructions, but cannot be preceded by other elements or text nodes.

"id" attribute:
  Used according to XML as an identifier, for referencing the whole AMIL document 2402.

"version" attribute:
  Used to identify the version of the AMIL document model 100.

"head module" 202:
  Encompasses all declarations referenced by child elements of the "body module" 204.

"body module" 204:
  Encompasses elements describing the Adaptation Possibilities.

2. AMIL Layout Module

The AMIL "Layout Module" 106 is taken on from the SMIL Layout Module as described in "Synchronized Multimedia Integration Language" (SMIL 2.0, W3C Recommendation, 7 Aug. 2001, http://www.w3.org/TR/smil2O/). Thereby, the elements "smil:layout",
  "smil:region", and
  "smil:root-layout"

are supported. Detailed information can be found in the SMIL documentation "The SMIL 2.0 Layout Modules" (http://www.w3.org/TR/smil20/layout.html).

"region" Element 502:

The element "smil:region" is taken over from the SMIL document model. Its attribute "smil:fill" is extended in order to consider the aspect of size adaptation. The state-of-the-art usage of this attribute is to specify the behavior if the intrinsic height/width of a media item 304 is not equal to the dimension of a region 502.

In AMIL, a region 502 can be used by different media items 304 during playing back a multimedia presentation, which means that media items 304 with different formats 600 are displayed in a region 502 with a well-defined dimension. Therefore, new attribute values for the attribute "smil:fill" are specified. The problem is that scaling the visual size of a media requires, under certain circumstances, a lot of CPU power. Especially up-scaling is a quite expensive operation. Down-scaling also takes CPU power, but not as much as scaling up. A further characteristic in AMIL is that a region 502 can be used by many media items 304, which can support different formats 600—e.g. the Common Intermediate Format (CIF), or Quarter CIF (QCIF). At a specific scaling factor, a replacement of a media does make more sense than scaling a media "endless" down.

It should be noted that
a) the media can only be scaled if the media itself is scaleable (that is a requirement),
b) the default behavior differs from the default behavior specified in SMIL, and
c) it is stated that the currently selected media is scaled to fit into the region's dimension, but by default the region's dimension does not influence the selection of the media.

"fill" Attribute:

This attribute is extended by the following values:
a) "amil:noscale" means that a media displayed in a specified region is not scaled at all—it is centered in the regions area 502.
b) "amil:upscale" means that a media displayed in a specific region is only scaled up, not scaled down. This value can be applied for specific media, whereby the behavior for scaling up is better than for scaling down.
c) "amil:downscale" means that a media displayed in a specific region is only scaled down, not scaled up.
d) "amil:replace" means that a media displayed in a specific region is not scaled at all—but the most appropriate media, according to the region's dimension and under consideration of the "current situation", is selected.
a) "amil:adapt" means that the underlying AMIL player decides what the best solution is. The player has the most knowledge and can determine what the best decision is. Based on meta information about the scaling behavior of the media, it is easier to find the best solution. Media are "scaled" and "replaced" with regards to the "current situation".

Note:
a) Scaling is a quite important feature and plays an important role:
  i. to fit the visual component of a media into a specific region.
  ii. to adapt the visual component of a media if the region itself is resized; e.g. as a result of a user interaction 404 (e.g. resizing of the application window). Especially in this case the replacement of a media would improve the visual presentation.

Example: In the case a region is scaled down by the half, a replacement of an H.263 encoded media in CIF image formage 600 by a H.263 encoded media format 600ted with QCIF image format 600 reduces the bandwidth significantly.

It is quite uncommon to use a namespace prefix as a prefix for the attribute values. It is to emphasize the difference to the attribute values defined in SMIL.

3. AMIL MediaItems Module

An adaptive multimedia application has somehow to describe all possible used media. As a result of an adaptation decision, made by the client-side middleware, a media might be replaced by a different one, with different properties.

A media item 304 is an abstraction for different kinds of media. It is distinguished between discrete media items 304 and continuous media items 304 (the later representing time-based media). A more detailed description 700 can be found in "Modeling of Adaptable Multimedia Documents" (Interactive Distributed Multimedia Systems and Telecommunication Services; 4th International Workshop, IDMS'97, Darmstadt, Germany, September 1997, pp. (420-429) by S. Wirag, R. Steinmetz, and L. C. Wolf (editors).

The "MediaItems Module" 108 serves as a description unit for all, in a specific multimedia application, available media items 304. The content of a media item 304 can be different, dependent on the characteristics of the media item 304 itself. In general, it can be differentiated between the following two categories:

Media items 304 describing discrete media which have the possibility to either reference the source by using the attribute "src" or provide the content as a part of the media item's content model (which can e.g. be done with XHTML as described in "XHTML™ 1.0: The Extensible HyperText Markup Language. A Reformulation of HTML 4 in XML 1.0" (W3C Recommendation, 26 Jan. 2000, http://www.w3.org/TR/xhtml1/) or VoxML as described in "VoxML Markup Language" (The XML Cover Pages, http://www.oasis-open.org/cover/voxML.html).

Media items 304 describing continuous media items 304 must reference the source by using the attribute "src".

Independent from this characteristic, every media item 304 can have meta information about itself as a part of its content model. Supported languages "Resource Description Framework" (RDF) as described in "RDF Model and Syntax Specification" (W3C Recommendation, 22 Feb. 1999, http://www.w3.org/TR/REC-rdf-syntax/) or Session Description Protocol Next Generation (SDPng) as described in "Session Description and Capability Negotiation" (IETF Internet Draft, work in progress, Bormann University Bremen, 21 Nov. 2001, <draft-ietf-mmusic-sdpng-03.txt>) by D. Kutscher et al.

"mediaitems" element 303:
The "mediaitems" element 303 is the outermost element of the "MediaItems Module 108". It serves logically as a container for all media items 304 used in an AMIL document 2402.

"id" attribute:
Used according to XML as an identifier for referencing the whole "MediaItems Module" 108.

"mediaitem" element 304:
A media item 304 is an abstraction for different kinds of media. It is distinguished between discrete media items 304 and continuous media items 304 (the latter representing time-based media). An element "mediaitem" 304, as a child of the element "mediaitems" 303, is used to describe the properties/characteristics of a media item 304, like e.g. the location of the content and meta information.

"id" attribute:
It is used according to XML as an identifier for referencing the media item 304 by the element "mediaitem" 304. The identifier "mediaitem" is used
a) in the MediaItems Module 108, and
b) in the Adaptation Possibility Description Module 2900.
The latter has an attribute "idref" referencing the specific media item 304 in the "MediaItems module" 108.

"type" attribute:
It specifies the kind of media. The attribute "type" is of type "mediaItemAttribute-TypeType" 308.
Thereby, the attribute "type" takes one out of the following values:
"audio", for audio stream,
"movie", for movie stream,
"video", for one audio and arbitrary video streams,
"text", for a text document,
"slideshow", for a slideshow presentation (e.g. take a picture of a movie every sixth second),
"textticker", (either stream or download), or "amil-document".

"src" attribute:
It specifies the location of the of the media item 304 as a URI.

Figure 25:
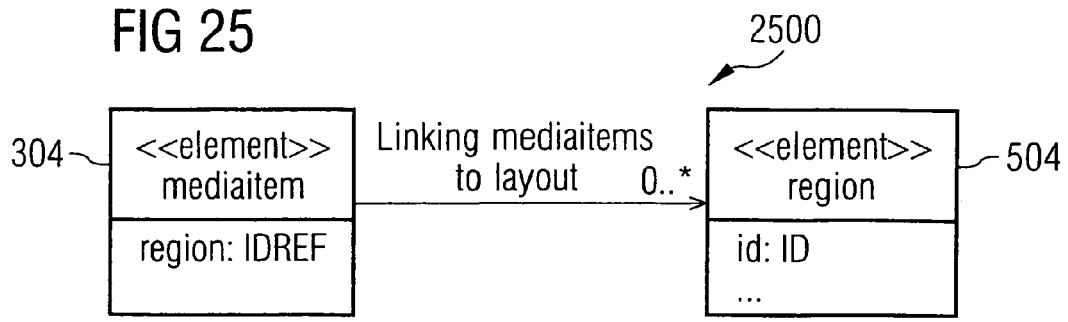

"region" attribute:
If a media item 304 has a visual component, said visual component is displayed in the referenced region 502. The region 502 is specified in the Layout Module 106.
As depicted in FIG. 25, a media item 304 can have multiple region for displaying a visual component in different regions 502.

Content model of the element "mediaitem" 304:
The content model of the element "mediaitem" 304 is defined in a way that it accepts documents (or document fragments), which are document instances of Extensible Hypertext Markup Language (XHTML), Scalable Vector Graphics (SVG), Session Description Protocol Next Generation (SDPng), or Resource Description Framework (RDF).
The content model of the element "mediaitem" 304 is defined in a way that it accepts documents (or document fragments), which are document instances of Extensible Hypertext Markup Language (XHTML), Scalable Vector Graphics (SVG), Session Description Protocol Next Generation (SDPng), or Resource Description Framework (RDF).

Note:
a) Owing to the lack of expressing complex constraints 802 in the XML Schema language, which will be replaced by Schematron on Relax NG in the next version, the exact semantic of the element "mediaitems" 303 in conjunction with the attribute"src" is the following:
If the attribute"src" is used the content of a media item 304 can only contain meta information expressed e.g. either by RDF or SDPng.
If the attribute "src" is not used, the content of the mediaitem has to contain exactly one document (SVG, XHTML, etc.) and arbitrary meta information expressed either in RDF or SDPng.

b) The type attribute does not specify in detail the exact type (mime-type) of an element "mediaitem" 304. Enhanced properties of an element "mediaitem" 304 can be expressed by the usage of RDF or as a part of SDPng.

c) An element "mediaitem" 304 accepts documents (or document fragments), which are document instances of XHTML 1.0, SVG, SDPng or RDF. There is no strict parsing of these documents as described in the document "XML schema Part 0: Primer" (W3C Recommendation, 2 May 2001). The entity in charge of reading the AMIL document 2402 assumes that the content is well formed XML. Documents (or document fragments) are passed directly to the associated player, which is in charge of handling the content.

4. Interactions Module

A multimedia application without any interaction mechanisms appears for the user as one video stream. Therefore, interaction 404 is a quite important mechanism to embrace the user and adapt to its personal preferences and the mobile device characteristics. The "Interactions Module" 110 specifies what kind of control elements is used in the application, its location and its start-up parameters.

Figure 26:
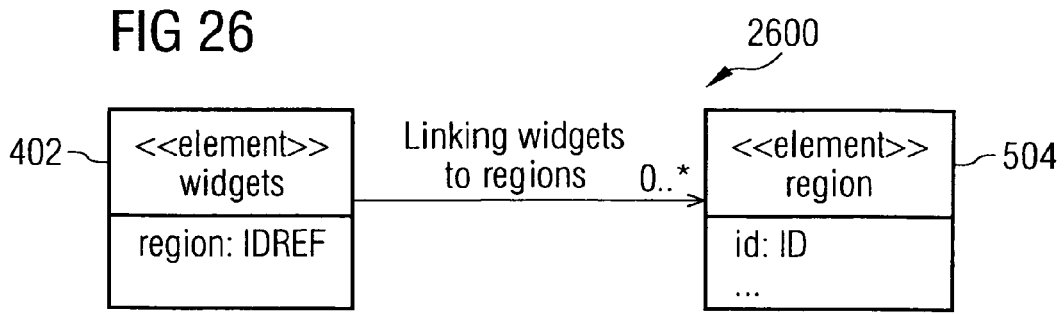

"widgets" element 402:
   The "widgets" element 402 is the outermost element of the Interactions Module 110. It serves logically as a container for all widget element 404s used in the AMIL document 2402.
   "id" attribute:
      Used according to XML as an identifier for referencing the whole "Widget Module" 110.
"widget" element 404:
   "id" attribute:
      Used according to XML as an identifier for referencing the widget 404.
   "type" attribute:
      Based on the value of the type the information is passed to a different handler.
      Thereby, the attribute "type" takes the value "class". The specific class is downloaded and instantiated. For any other value, a specific player is searched for and the reference is passed to the player.
   "class" attribute:
      If a specific widget 404 is of type "class" this attribute has to be specified, referencing the class in charge of doing the interaction task.
   "src" attribute:
      If a specific widget is not defined or of type "noclass", this attribute has to be specified, referencing the "src" of the widget. (For example, this can be an SVG document.)
   "region" attribute 502:
      If a media item 304 has a visual component—this visual component is displayed in the referenced region 502. Thereby, the region 502 is specified in the Layout Module 106.
      As depicted in FIG. 26, a media item 304 can have multiple regions 502—for displaying a visual component in different regions 502.
"param" element 406:
   The element "param" 406 is used to specify the initial parameter of the widget 404. It is like a property, specified by key/value pairs expressed as attributes of this element.
   If a widget 404 is of type "class", the loaded class has to support a constructor for passing all the properties.
   "key" attribute:
   Specifies the key of the property.
   "value" attribute:
   Specifies the value of the property.
Note:
The difference between an interaction 404 and an "mediaitem" 304 is that a widget is used for navigational interaction 404; a media item 304 as defined above is an abstraction of a media. There is an intersection between interactive media like a SVG 306a application and a widget—or course a widget itself can be realized by a SVG 306a application. But from a logical point of view it is worth to distinguish between the "interaction" element 404 and "mediaitems" element 303.

5. Adaptation Module or Adaptation Description Module

The "Adaptation Description Module" 109 is by far the most important module in AMIL. It describes the adaptation possibilities 1500. By contrast, the modules mentioned above have more a "descriptive" character. Describing how the layout 3702 looks like, the property of each media item 304, the interactions 404, and so far. This module describes the essential adaptive multimedia application by referencing elements of the other modules—especially the "MediaItems Module" 108 and the "Interactions Module" 110.

"adaptation" element 2901:
   The "adaptation" element 2901 is the outermost element of the "Adaptation Description Module" 109. It serves logically as a container for the adaptation description 2900 used in an AMIL document 2402.
   "id" attribute:
      According to XML, it is used as an identifier for referencing the whole Adaptation Possibilities Description Module.
"par" element 702:
   A "par" element, short for parallel, defines a simple time grouping in which multiple elements must be played back at the same time. It serves as a container wherein all direct child elements are started at the same time.
"seq" element 2904:
   The "seq" element 2904 defines a sequence of elements in which elements play one after the other. The syncbase of the child elements of a "seq" element 2904 is the active end of the previous element. Previous means the element which occurs before this element in the sequence time element. For the first child of a sequence (i.e. where no previous sibling exists), the implicit syncbase is the beginning of the sequence time element.
"choose" element 704
   The choose element allows specifying various alternatives. One is selected during playing back the multimedia presentation based on the "current situation" of the environment. Means that the characteristics of each media is aggregated once, before the media is used, and based on the environmental fluctuation (variation of the resource consumption), which are continuously monitored during playing back the multimedia presentation, one—out of the alternatives—is selected.
   Note: The choose element selects that media item 304 which is the best for the "current situation"—it does not know anything about the content, e.g. which scene is currently displayed. If at a specific point in time the "current situation" changes in the way that a continuous media item 304 is replaced by a different continuous media item 304 the new one is simply started according to a media item's "startmode" attribute.
   Example:

```
<choose>
  <mediaitem idref="media_A_high_quality">
  <mediaitem idref="media_A_middle_quality">
  <mediaitem idref="media_A_low_quality">
</choose>
```

Figure 30:
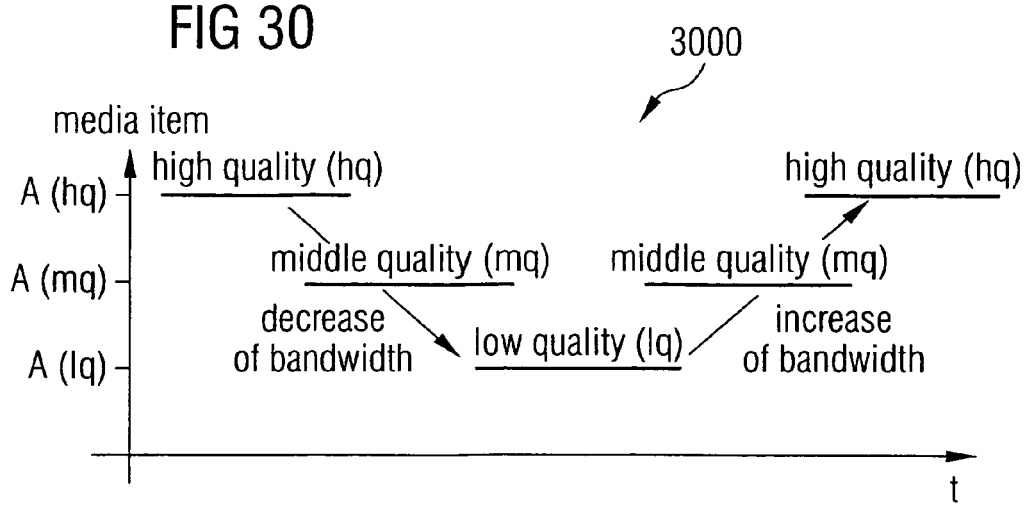
Figure 31:
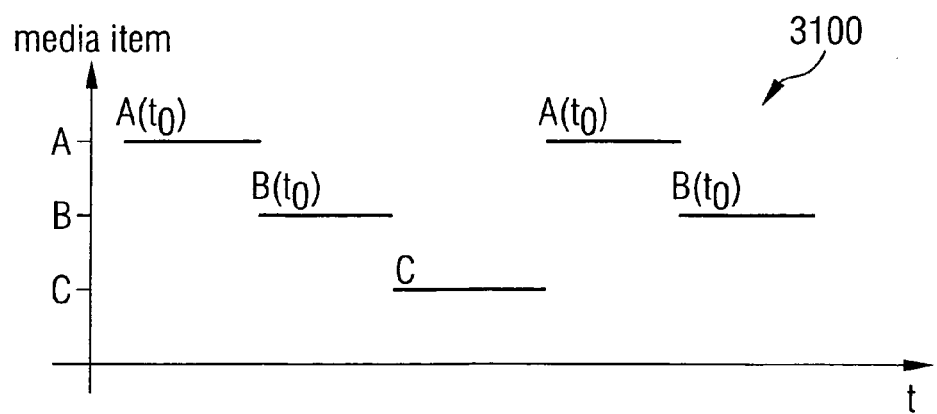
Figure 37:
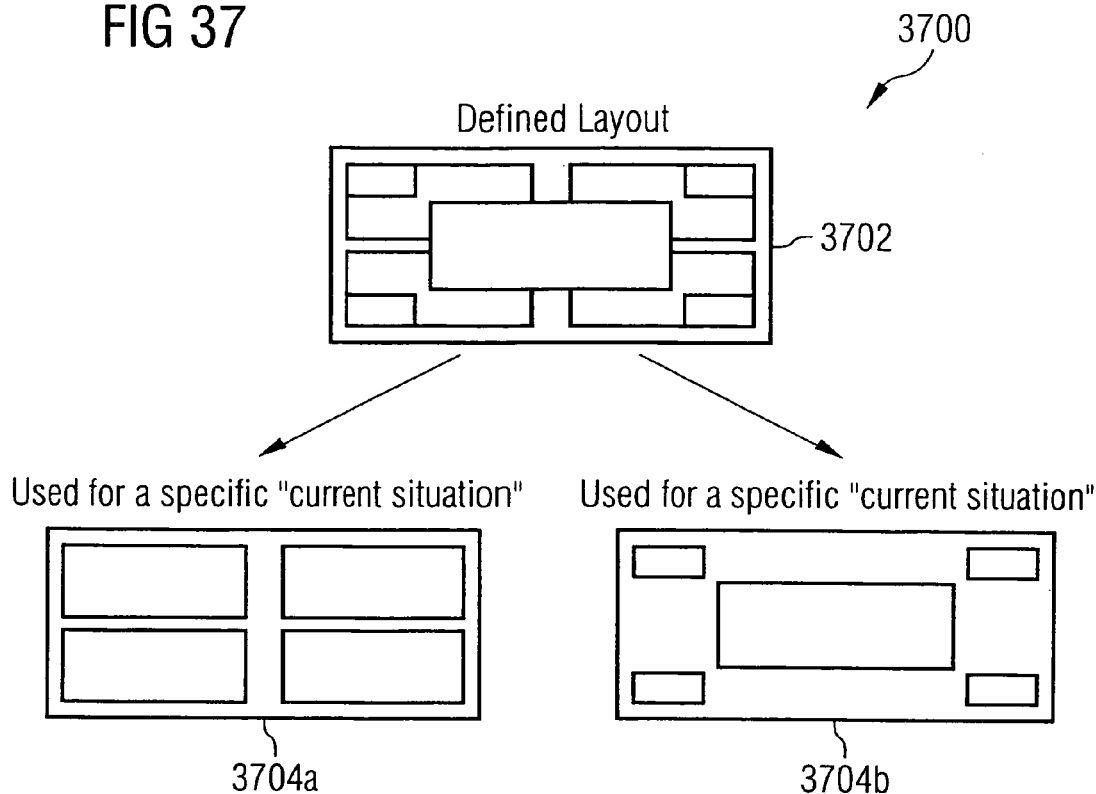
FIG. 37 illustrates changes of the current situation resulting in modifications of the linking structure of the AMIL document.

As depicted in FIG. 30, it is assumed that the resource situation at the beginning is quite good, allowing to start with a the high quality media "A(hq)". While playing back, the resource condition downgrades and the presentation has to be adapted to the media "A(mq)" with middle quality. Due to the fact that the resource situation further severely downgrades, the systems adapts to use the media "A(lq)" with the least resource consumption. After a while, the resource situation improves, which results in presenting "media A(hq)" again. The process stops—by default—as soon as the first media is finished.

Several elements "choose" 704:

As mentioned above, a choose statement allows specifying different alternatives. That is quite clear if only one "choose" element 704 is considered. In the more common case, however, an adaptation description 2900 consists of several parallel "choose" elements 704:

```
<par>
   <choose>
      <mediaitem idref="m1">
      <mediaitem idref="m2">
   </choose>
   <choose>
      <mediaitem idref="m3">
      <mediaitem idref="m4">
   </choose>
</par>
```

Thereby, the enclosed element "par" 702 logically acts as a "AND" expression. Furthermore, each elements in a "choose" element 704 is logically expressed by an "OR" expression. This results in the Boolean expression (m1 OR m2) and (m3 OR m4), which may be expressed by a Disjunctive Normal Form (DNF)

(m1 AND m3) OR (m1 AND m4) OR (m2 AND m3) OR (m2 AND m4).

Based on the current resource consumption, which is measured continuously, one alternative out of (m1, m3), (m1, m4), (m2, m3), or (m2, m4) is selected and played back.

Figure 9:
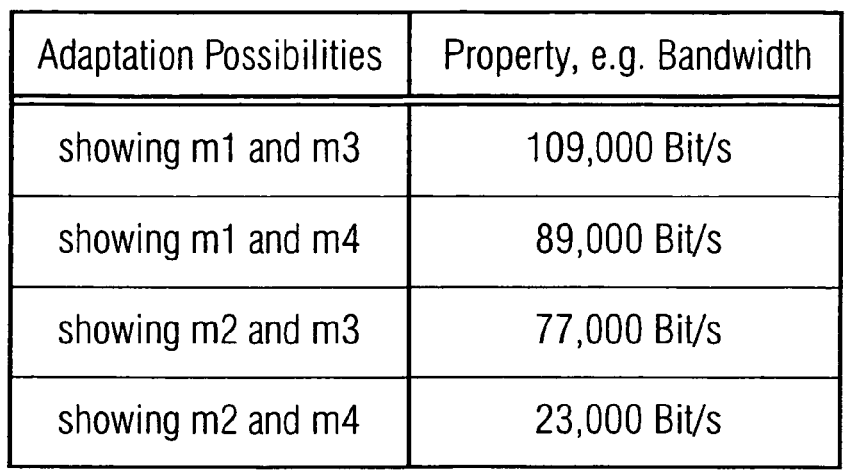
FIG. 9 shows a first table illustrating different adaptation possibilities.
Figure 10:
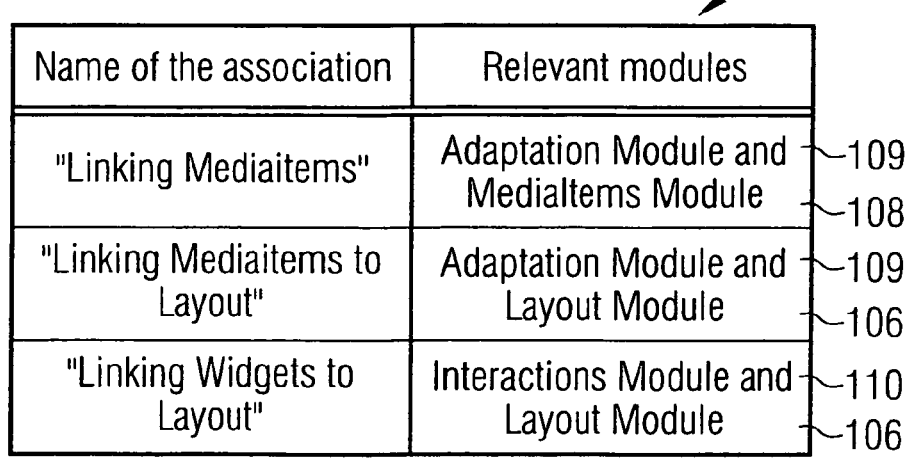
FIG. 10 shows a second table illustrating the applied association for modeling the linking between the Adaptation Module and the MediaItems Module, between the MediaItems Module and the Layout Module, and between the Interactions Module and the Layout Module.

FIG. 9 depicts the adaptation possibilities 1500 resulting from the adaptation description 2900 example shown above. It should be noted that this table does only show one property; in fact, various properties can be associated with one adaptation possibility 1500.

The adaptation description module 2900 provides the "choose" element with different attributes for modifying its default behavior. These are discussed in the following.

"startmode" attribute:

This attribute specifies at which playtime a specific media, especially continuous media, is started after an adaptation has been done. It is distinguished in general between the media time axis and the time axis of the enclosed choose element. In the following the semantic of the different values are explained by the means of the following example:

```
<choose startmode="attributevalue">
   <mediaitem idref="A">
      <!-- continuous mediaitem-- >
   <mediaitem idref="B">
      <!-- continuous mediaitem-- >
   <mediaitem idref="C">
      <!-- discrete mediaitem-- >
</choose >
```

Thereby, the media items 304 referenced by "A" and "B" are assumed to be continuous media items, and "C" is assumed to be a discrete one like an image.

In FIGS. 31 to 34:

A(tx) means that the time axis of the specific media item 304 is used.

A(t) means that the time axis of the enclosed choose element is used.

'A' means that the specific media item 304 is a discrete one, which does not have a time axis.

| | |
|---|---|
| restart: | Indicates that the media item 304 should always start from the beginning (cf. FIG. 31). |
| resume: (default) | Indicates that the media items 304 should always start from the position it stopped (cf. FIG. 32a). |
| laststop | Indicates that the media item 304 should always start at the media time the last continuous media item 304 contained in the same choose element stopped (cf. FIG. 32b). |
| playtime | Indicates that the media item 304 should always start at the time, which is the combined playtime of all media items 304 contained in the element "choose" 704 since the element "choose" 704 is started (cf. FIG. 33). |
| contplaytime | Indicates that the media item 304 should always start at the time, which is the combined playtime of all continuous media items 304 contained in the element "choose" 704 since the element "choose" 704 is started (cf. FIG. 34). |

"starttime" attribute:

Specifies the point in time when the media is started. By default, a media starts from the beginning (see "startmode" attribute above). This behavior can be modified with the attribute "starttime". The attribute's value consists of a number and is interpreted as seconds.

For example, the following code fragment illustrates that each media item 304 is started not at the beginning but rather five seconds later.

```
<choose startmode="attributevalue" starttime="5s">
   <mediaitem idref="A"> <!--continuous mediaitem-- >
   <mediaitem idref="B"> <!--continuous mediaitem-- >
   <mediaitem idref="C"> <!--discrete mediaitem-- >
</choose>
```

It should be noted that this attribute is only considered, if the "startmode" attribute exists and its value is "restart". This constraint 802 can not be expressed in XML Schema.

"onremove" attribute:

This attributes specifies what happens if a continuous media item 304 is played back. Regarding the lifecycle of such a media item, a media item 304 is started, played back, the time for playing back might be different from the length of the movie, and is stopped if the media is over. This results in "stopping" or "destroying" all adaptation possibilities 1500, or simply "removing" the specific media item 304. If a "choose" element 704 does not contain any continuous media item 304, the attribute value is ignored.

| | |
|---|---|
| destroy | Indicates that the complete choose should be removed when a child is removed. |
| remove (default) | Indicates that the child which reached the end of its playtime is removed. The choose is only removed if this was the last remaining child in the choose. |

"looping" attribute:

Indicates that the media items 304 (if they are continuous) should start from the beginning if the media ends.

| | |
|---|---|
| true | Indicates that the media is played from the beginning if the media ends. |
| false (default) | Indicates that the media is not played again. |

"evaluation" attribute:
  Specifies if the element "choose" 704 is evaluated once at start-up time, repeatedly in a specific time period or continuously while playing back the multimedia presentation.

| | |
|---|---|
| start-up | Means that the choose element is evaluated once, based on the adaptability parameters at start up time. |
| 10 s | Indicates that the choose element is evaluated every specified time period, based on the adaptability parameter at that time. |
| con (default) | Indicates that the element "choose" 704 is evaluated if a specified threshold of a parameter, describing part of the current situation, is exceeded. This means, that an adaptation will take place if the current situation changes. |

"priority 1400" attribute:
  Specifies the priority 1400 of the "choose".

"empty" attribute:
  By default the element "choose" 704 allows specifying different alternatives. One of them is selected during playing back the multimedia presentation. If the attribute empty is set to "true" it might be, dependent on the current situation, that no media is selected out of the choose element.

```
<choose empty="true">
  <mediaitem idref="m1">
  <mediaitem idref="m2">
</choose>
```

(Results in playing back, at a specific point in time, "m1" or "m2" or none of both.)

| | |
|---|---|
| true | Indicates that the alternative, that no media is selected out of the adaptation possibilities 1500, is valid. |
| false (default) | Indicates that one media has to be selected out of the described adaptation possibilities 1500. |

"mediaitem" element 304:
  The element "mediaitem" element 304 specifies the used media from the MediaItems Module 108, which means that the media item 304 in the adaptation description module 2900 is simply a placeholder. Characteristics of a continuous media and to some extend content of discrete media is described in the MediaItems Module 108. Due to the distinction between MediaItems Module 108 and the Adaptation Description Module 109, the description 700 of the adaptation is quite easier.

"priority" attribute:
    Specifies the priority 1400 of the "mediaitem" element.

"idref" attribute:
    The attribute "idref" is of type "IDREF" as described in "Extensible Markup Language (XML) 1.0" (Second Edition, http://www.w3.org/TR/REC-xml) by Tim Bray (Textuality and Netscape), Jean Paoli (Microsoft), C. M. Sperberg-McQueen (University of Illinois, Chicago), and Eve Maler (Sun Microsystems, Inc.), referencing a specific "mediaitem" part of the "MediaItems Module" 108. The link realize the dependency "Linking Mediaitems".

"starttime" attribute:
    Specifies the point in time the media is started. By default the media starts from the beginning (see "startmode" attribute above). This behavior can be modified with the attribute "starttime". The attribute's value consists of a number and is interpreted as seconds.

For example, the following code fragment illustrates that the media item 304 is started not at the beginning but rather five seconds later.
      <mediaitem idref="A" starttime="5 s">

It should be noted that this attribute overrides the attribute "starttime" from the element "choose" 704. It is only considered in the following two cases:
      1. if the media item 304 is a part of a "choose" element 704, and the attribute "startmode" is specified there and has the value "restart",
      2. if the media item 304 is not part of a "choose" element 704.
    In the later case, the value specifies the initial start time of the media item 304.

In the following, the "switch" element used in SMIL shall be compared with the "choose" element 704 of AMIL according to one embodiment of the underlying invention.

a) From a Semantic Point of View

A choose element in SMIL allows "an author to specify a set of alternative elements from which only one acceptable element should be chosen. An element is acceptable if the element is a SMIL element, the media-type can be decoded, and each test-attribute of the element yields "true". An element is selected as follows: The player evaluates the elements in the order in which they occur in the switch element. The first acceptable element is selected at the exclusion of all other elements within the switch.

This is in contrast to the semantics of the element "choose" 704 used in the "Adaptation Description Module" 109. As described above, all possible media of an element "choose" 704 are evaluated, which means that the media's properties (e.g. bandwidth, duration, etc.) are evaluated and stored in an internal data structure—cf. description of the "Configuration List" in "Modeling of Adaptable Multimedia Documents" (Interactive Distributed Multimedia Systems and Telecommunication Services; 4th International Workshop, IDMS'97, Darmstadt, Germany, September 1997, pp. 420-429) by S. Wirag, R. Steinmetz, and L. C. Wolf (editors). At start-up time and if the "current situation" changes, the adaptation description 2900 is evaluated and the most appropriate adaptation possibility 1500, for the "current situation", is selected and played back.

b) From an SMIL Document Author Point of View

In SMIL, the author describes which media is used in which condition. The condition (logical expression described with the attribute "test") is a fix part of each media element in SMIL. During start-up time, the SMIL player sequentially evaluates each media element's condition. If the condition can be fulfilled, the media is selected for playing back.

Note:
  a) The author specifies which resource are considered (e.g. bandwidth, screen size, etc.)

b) The author specifies the order in which the elements" condition is evaluated.
c) The current situation, as used in SMIL, is described by the properties used in the conditions.
d) The SMIL standard does not claim, that the element "switch" is re-evaluated if the "current situation" changes.
e) The focus of SMIL is on applications running in a static environment. The application is adapted once, during start-up.

In SMIL, the properties describe the situation in which one or a set of media items 304 has to be chosen. In the "Adaptation Description Module" 109 the properties describe attributes of the media items 304 and the "AMIL player" uses this information to find out which set of media items 304 to use for an actual situation. (Example: If the available bandwidth is below 1 MBit/s, two media items 304, A and B, are used. A needs 300 kBit/s and B needs 400 kBit/s.) In SMIL, the author has to manually create the mapping from media attributes to situations during authoring time. In the "Adaptation Description Module" 109 this mapping is left to the browser, which simplifies the authoring significantly, especially as the media item properties can often be created automatically, thereby using meta data for the media or by examination of the media files.

In AMIL, the "AMIL player" aggregates information about the "current situation" and the media, which is a part of the adaptation description 2900. Based on the "current situation", that is monitored continuously, a specific "adaptation possibility" 1500 is selected and used for playing back until the "current situation" changes and a new "adaptation possibility" 1500 is selected. The author can give hints to express the author's preferences, which can influence the decision which adaptation possibility 1500 is used for playing back. In AMIL, the decision which media is chosen is determined by the adaptation control unit, but the author of the document can influence the adaptation control process by the usage of attributes supported by elements of the "Adaptation Possibility Module" 109—e.g. the priority attribute 2810 of the elements "switch" and "mediaitems" 304.

c) From an Adaptation Point of View

If the "current situation" changes, an adaptation is accomplished, which means that media are substituted. The exact behavior how this is done is not described in SMIL. AMIL supports the author of a document with different attributes, e.g. a "startmode" for specifying the transition from one media to another media, restart and looping functions if the movie is over, and so on.

Priority Attribute

The attribute "priority" 2810 is supported with the elements "choose" 704 and "mediaitem" 304 and enables the weighting of adaptation possibilities 1500. To understand the idea of priorities 1400, the concept of adaptation possibilities 1500 should be reminded.

Based on the "Adaptation Possibility Description" mentioned above, different adaptation possibilities 1500 are calculated. While playing back, appropriate adaptation possibilities 1500 matching the "current situation" are selected. Thereafter, the adaptation possibility 1500 with the highest priority 1400 out of the set of appropriate adaptation possibilities 1500 is selected.

The first activity diagram depicted in FIG. 23 shows that if the "current situation" has changed; out of all available adaptation possibilities 1500 the set that matches the "current situation" is filtered out. Out of this set, the adaptation possibilities 1500 with the highest priority 1400 are selected. If at the end more than one adaptation possibility 1500 is left, either that with the lower resource consumption is selected or the selection is done randomly.

Figures 14, 15:
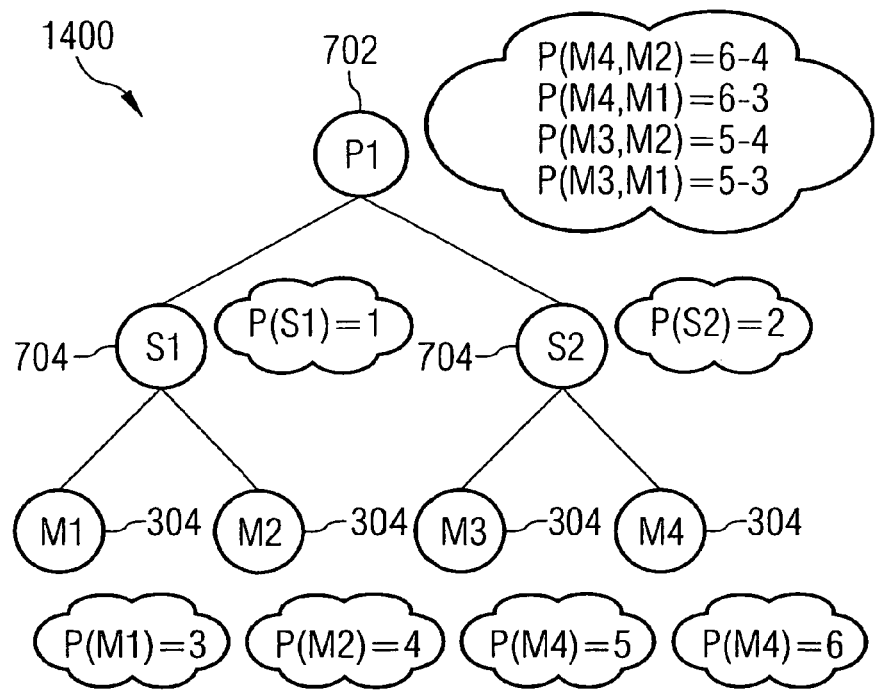
FIG. 14 shows an example for calculating priorities.
FIG. 15 shows an example for adaptation possibilities (APs)

The evaluation of the priorities 1400 is done in line with the calculation of all adaptation possibilities 1500. FIG. 15 shows the adaptation possibilities 1500, thereafter sometimes abbreviated with "AP", derived from the adaptation possibility 1500 description 700 depicted in FIG. 13. Adaptation Possibilities (APs) are calculated in such a way that a "choose" element 704 is considered as an "OR" operator, and a "par" element 702 as an "AND" operator. This results in the following "Boolean" expression:

(M4 AND M2) OR (M4 AND M1) OR (M3 AND M2) OR (M3 AND M1).

Thereby, the selection of one "AND" expression (e.g. M4 AND M2) (also named adaptation possibility 1500) is based on the "current situation".

The evaluation of the associated priority 1400 of an adaptation possibility 1500 is done in the following way:
1. All children of a "par" element 702 are sorted according to their priority 1400.
2. The configurations of the first two child elements are merged (by means of an AND operator). The priority 1400 of the resulting configurations consist of the priority 1400 of the higher prioritized child is appended to the priority 1400 of the lower-prioritized child. (Thereby, the character "-" is used as a separator.).
3. The result is repeatedly merged with all other children of the "par" element 702. The priorities 1400 are always handled as in step 2.
4. Element of type "choose" 704 do not perform any priority calculation. The element "choose" 704 represents an "OR" operation, in which the results from the child elements are just combined and not modified—including the priorities 1400.

The result at the end is a list of possible adaptations attributed with an attribute priority 1400 calculated from the priorities 1400 of the used media of this possible adaptation.

Linking between Elements

Figure 27:
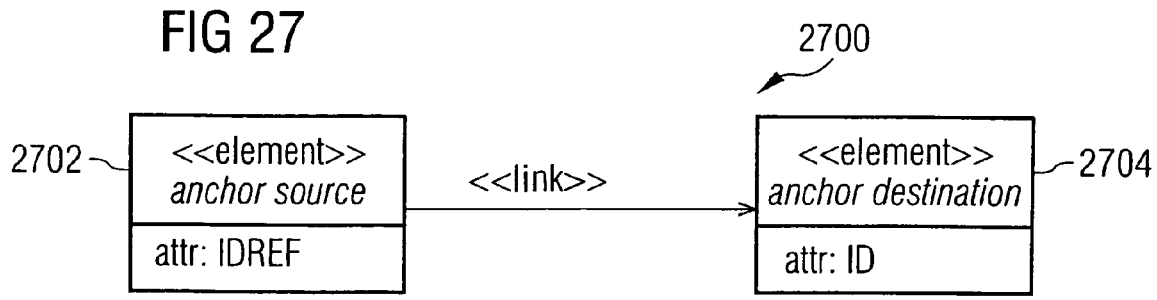

The term "link", as used in this document, describes the connection of different elements in one AMIL document 2402—in contrast to the general meaning where various Web resources (in different documents) are linked together. A link is described by its "source anchor" 2702 and its "destination anchor" 2704 as depicted in FIG. 27. An anchor's source 2702 is described by the usage of the XML attribute "id"—an anchor's destination 2704 by the XML attribute "idref". Both attributes are validated during the parsing of an XML document (without the usage of XML Schema).

Figure 5:
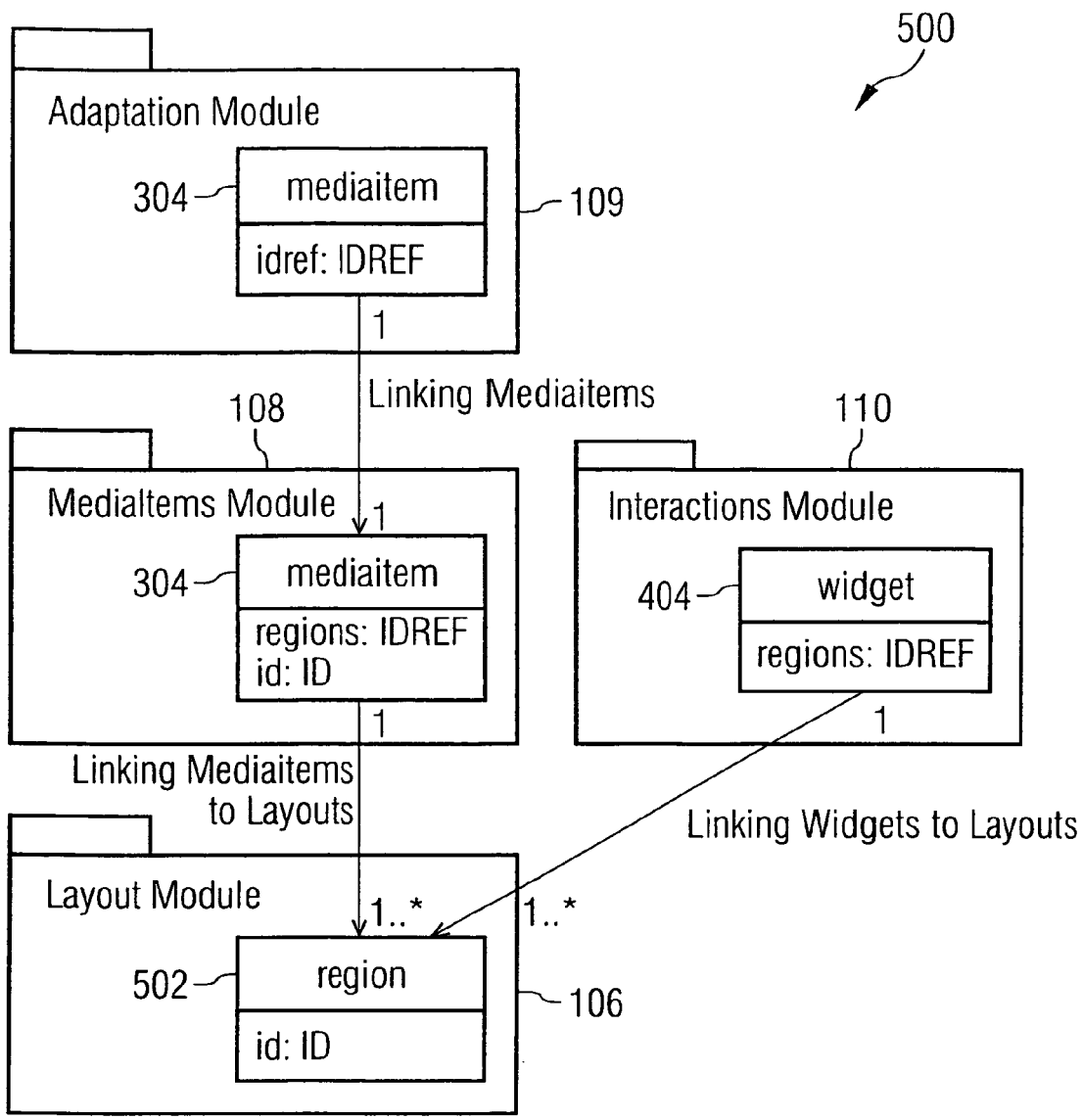
FIG. 5 illustrates the relations between the Layout Module, the MediaItems Module, an Adaptation Module, and the Interactions Module, FIG. 6 exhibits the format of a typical mobile multimedia presentation.

FIG. 5 depicts the association between various modules. Linking is quite important since the information itself is distributed over different modules. The "Adaptation Description Module" simply describes the adaptation possibilities 1500—the media itself is described in the "MediaItems Module" 108, interactions 404 are described in the "Interactions Module" 110, and the whole layout 3702 is described in the "Layout Module" 106. Said modules enable the splitting of information, which allows the modification of e.g. the layout 3702 without touching anything from the "MediaItems Module" 108 or the "Interactions Module" 110—as long as all linked region are still available.

FIG. 9 depicts the name of the association and their modules used to describe the linking 1600 between the AMIL modules.

Figure 6:
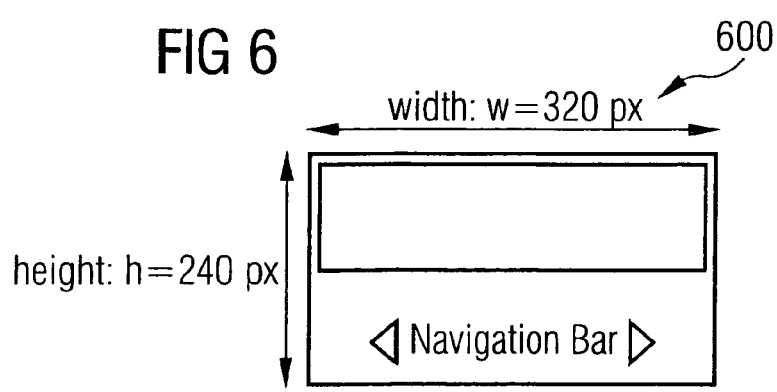
Figure 7:
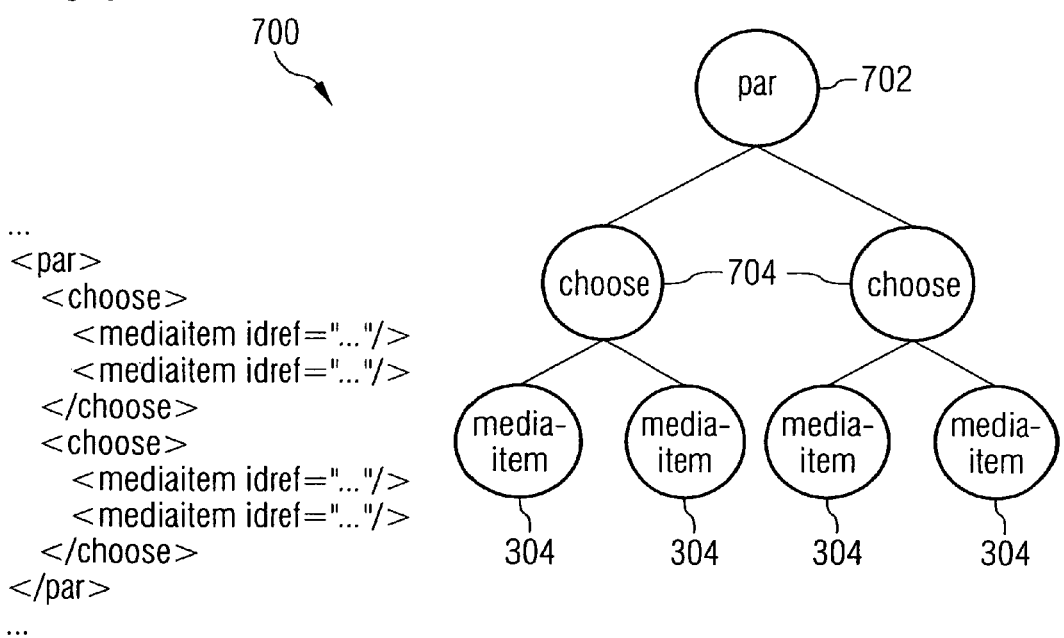
FIG. 7 shows the description of an AMIL document in the AMIL DOM data structure, FIG. 8 exhibits a Constraint Module according to one embodiment of the underlying invention.

FIG. 16 shows an exemplary instance document. For the sake of that example, the document is hold quite simple. Thereby, the adaptation description 2900 is reduced to one media item 304, the properties of that media item 304 are described in the "MediaItems Module" 108 and linked with the aid of the attribute "idref". Both elements, the media item 304 of the "MediaItems Module" 108 and the widget 404 of the "Interactions Module" 110, refer to an element region 502 of the "Layout Module" 106 where they are displayed. FIG. 6 shows how this multimedia presentation looks like.

Note:
a) A "mediaitem" element 304 of the "MediaItems Module" 108 is not needed to support a reference to an element "region" 502 of the "Layout 3702 Description Module". This is optional and makes only sense for media with a visual component, which means that if a media specifies a region for rendering and it has a visual component, this visual component is displayed in the referenced region.
b) The visual component is set to the size of the specified region. If the media does not fit into the region it is scaled by default.

Granularity of Reuse

As authoring of multimedia presentations is a quite time-consuming and costly task, attention has been drawn to reuse adaptive multimedia applications for efficiency and economical reasons. However, this has to be considered quite carefully. First, the documents are generated dynamically for each request. Therefore, it is quite hard to reference a part of document which is not statically available.

Moreover, there is no restriction in using a static AMIL document 2402 saved e.g. on the file system. For this reason, a further media type named "amil-document" has been introduced. A media item 304 of type "amil-document" is rendered in its specified region.

Figures 17, 18:
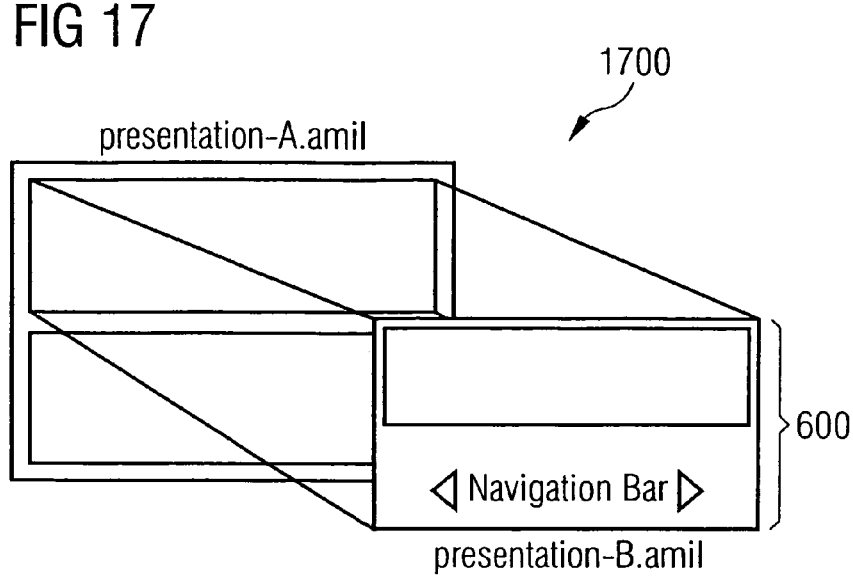
FIG. 17 shows an example for the reuse of an AMIL document.
FIG. 18 shows an example for additional functionality.

FIG. 17 shows how an adaptive multimedia presentation can be used as part of another one. Thereby, the multimedia application "presenstation-B.amil" is referenced as a media item 304 out of another multimedia application described in "presentation-A.amil".

Note: Several elements contain an attribute of type "ID", which allows referencing them. The current version of AMIL, as described here, does only support the reuse 1700 (referencing) on document level. Further version might allow the reuse 1700 (referencing) of specific modules.

AMIL Namespace

Namespaces (see World Wide Web Consortium: "Namespaces in XML", 14 Jan. 1999, http://www.w3.org/TR/REC-xml-names/) are quite common in the XML world to distinguish between different vocabularies. AMIL use the URI "www.sony.de/amil" to reference to the newest version of the vocabulary. FIG. 40 shows a complete AMIL document 2402, wherein the namespace is explicitly used throughout the whole document.

AMIL Document Object Model (AMIL DOM)

In the scope of the underlying invention, an AMIL Document Object Model (AMIL DOM) has been introduced to describe an AMIL document 2402 in an abstract document model structure. It supports the dynamically access and update of the content and structure of an AMIL document 2402. The document can further be processed, and the results of that processing can be incorporated back in the presented document. The AMIL DOM is quite straightforward. In fact, it is an extension to the DOM proposed by W3C. Like "XHTML 306b DOM" and "WML DOM", "AMIL DOM" simply extents the basic W3C DOM by means of an AMIL-specific vocabulary.

In extension to state-of-the-art document object models, AMIL DOM supports a simplified transaction model. This allows making a set of logically grouped manipulations to the AMIL DOM, which results in the support of transactional modification for adaptive documents. For example, the replacement of an "adaptation-description-specific" element "choose" 704 has to be done as an atomic change, which results in a recalculation of all adaptation possibilities 1500. If that is not done atomically, a modification might be a quite crucial step, which results in an inconsistent state.

Figure 28:
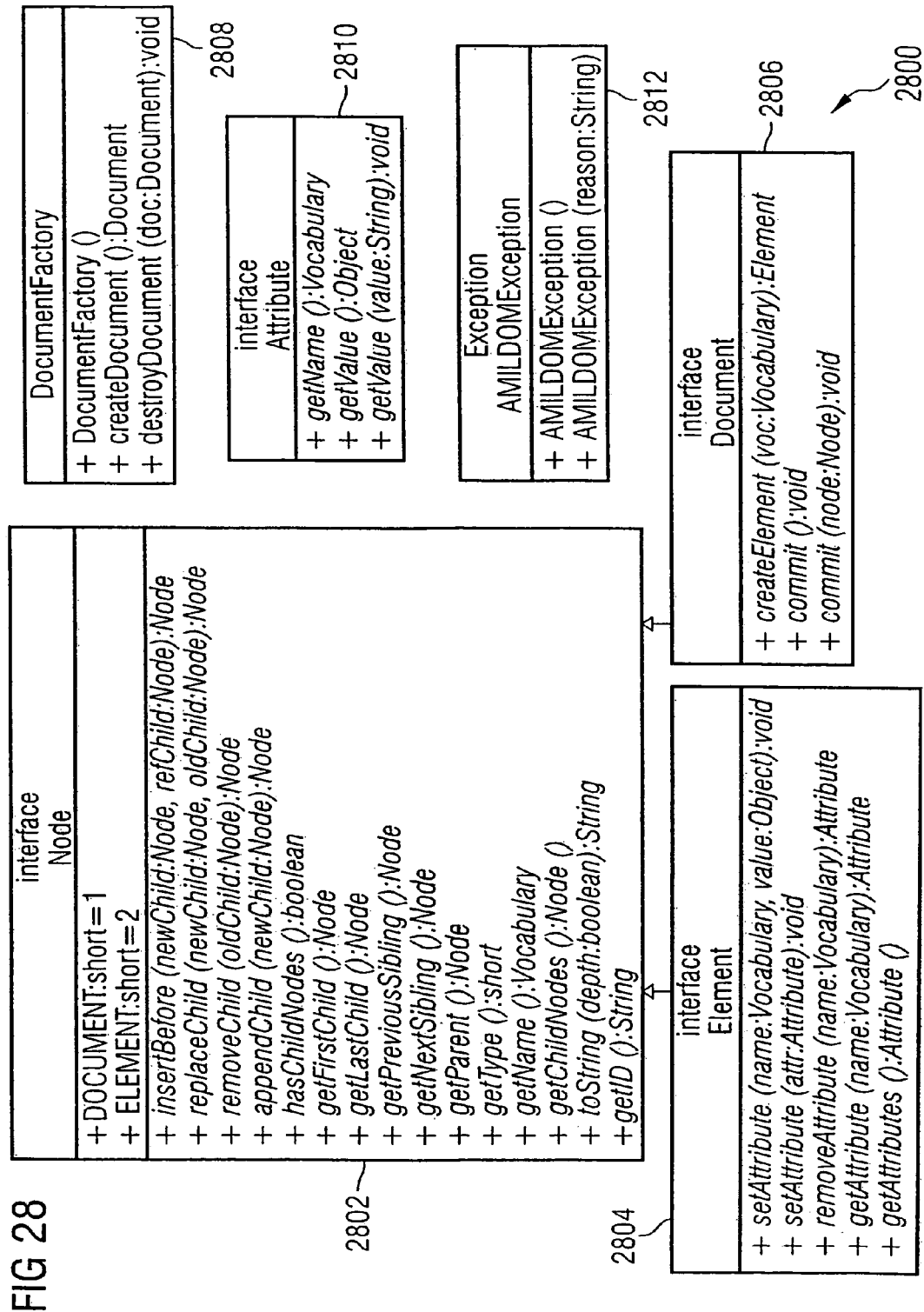
Figure 29:
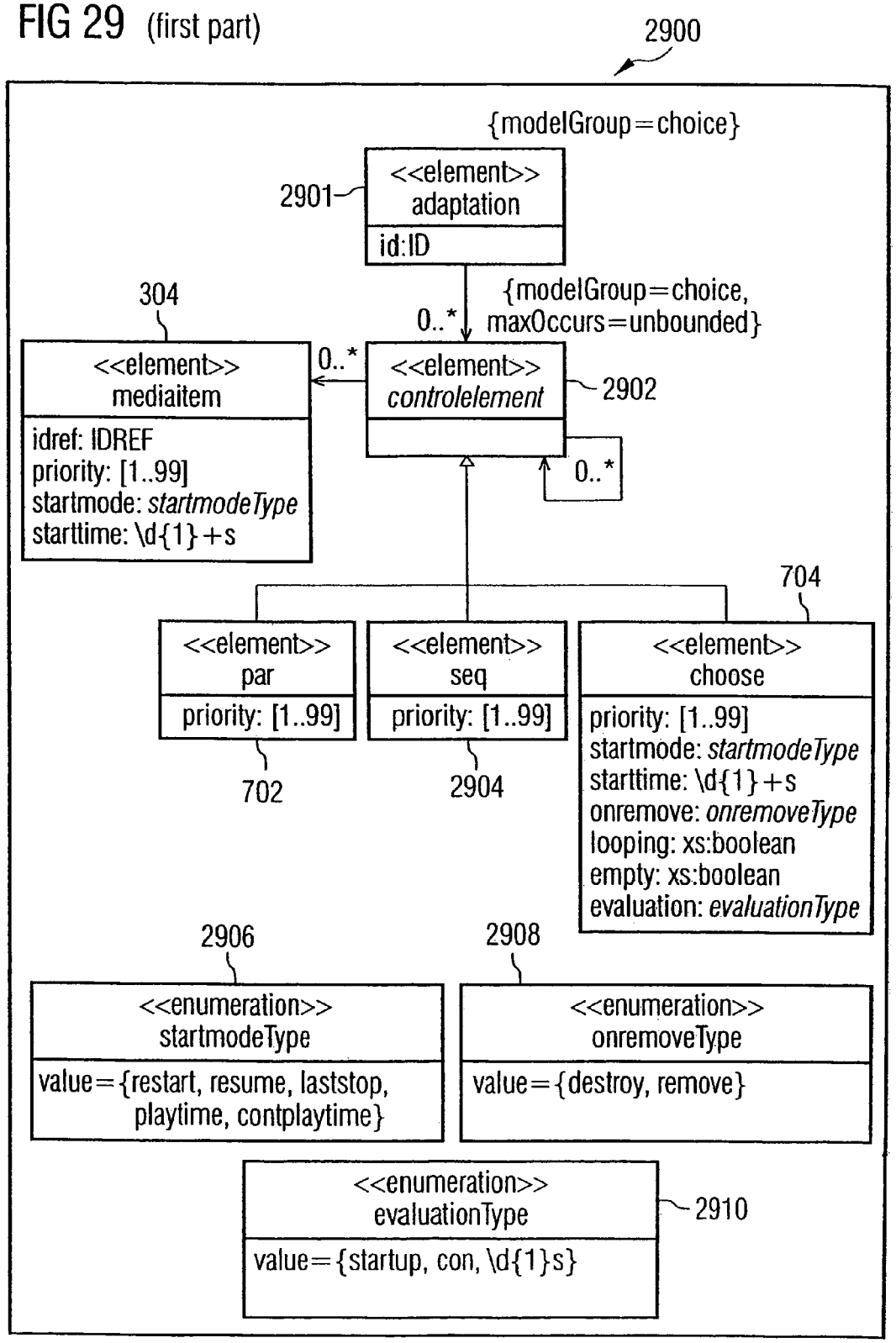

As depicted in FIGS. 28 and 35, the AMIL DOM supports, aside from state-of-the-art primitives, primitives for doing simple transaction-oriented processing by enhancing the interface "document" 2806 with a "commit" primitive. It should be noted that modifications are not passed to the middleware until the "commit" primitive is triggered.

After having created an internal presentation of an AMIL document 2402, it can be adapted to changes in the "current situation", e.g. a user interaction 404 or the change of the user's location. Modifications do not get visible until they are committed. This fact is depicted in FIG. 36. The illustration on the right shows how the layout 3702 can change after the document has been modified.

The following sections introduce modules that can optionally be used for a more detailed description 700 of the adaptation process. They are not mandatory, which means that an AMIL document 2402 is semantically valid without these modules.

1. Events Module

An "event" 3802 is a signal to the AMIL Browser from any sensor, indicating that the "current situation" has changed. As mentioned in the introduction, the "current situation" is categorized into three different dimensions: network QoS, mobile device capabilities and user context. In this scenario, an AMIL document 2402 is dynamically generated at request time, based on the "current situation". After that, the supporting middleware, as described in the article "Modeling of Adaptable Multimedia Documents" (Interactive Distributed Multimedia Systems and Telecommunication Services; 4th International Workshop, IDMS'97, Darmstadt, Germany, September 1997, pp. 420-429) by S. Wirag, R. Steinmetz, and L. C. Wolf (editors), controls the adaptation process of the media specified in the AMIL document 2402—but the AMIL document 2402 remains quite static. With the introduction of the AMIL "Events Model" 118, changes of the "current situation" can influence the document in different ways:

a) Modification of the linking structure: The AMIL document 2402 consists of a vocabulary, a hierarchical structure (which defines how the elements are nested) and a non-hierarchical structure (which describes how the elements are linked). A change of the "current situation" can result in the modification of the linking structure. Thereby, the associations "Linking Mediaitems and Layout" and "Linking Widgets and Layout" are changed (cf. FIG. 37).
b) Modification of the whole document structure: This results in an updated or totally different AMIL document 2402.

Figure 24:
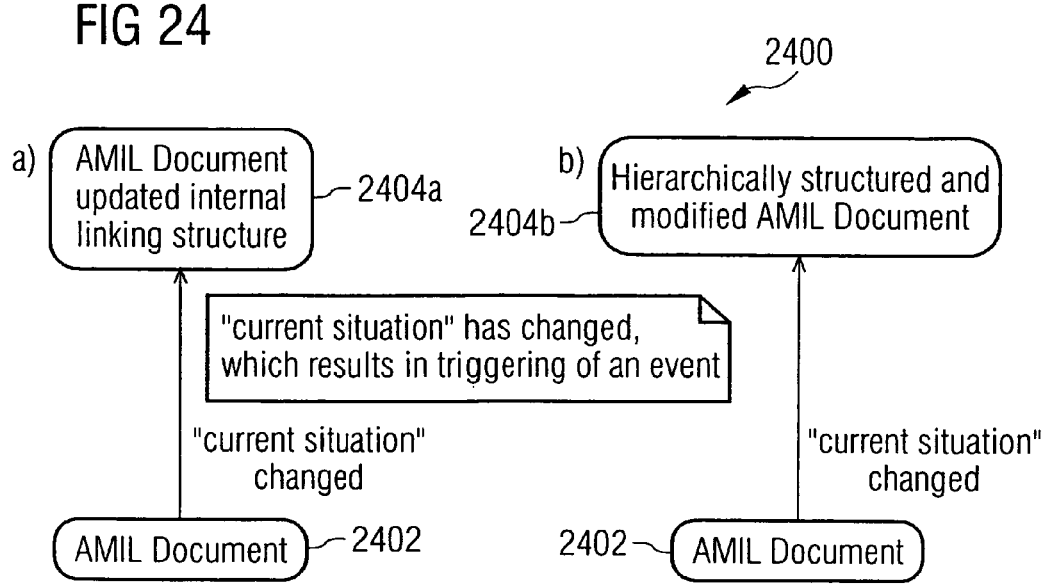
FIG. 24 presents a second activity diagram illustrating changes of the applied AMIL DOM data structure, FIG. 25 outlines a first UML class diagram showing the relation between media items and regions, FIG. 26 outlines a second UML class diagram showing the relation between widgets and regions, FIG. 27 outlines a third UML class diagram illustrating the applied linking elements, FIG. 28 outlines a fourth UML class diagram showing the application programming interface (API) of the applied AMIL DOM data structure, FIG. 29 gives an overview of the adaptation description module, FIG. 30 exhibits a diagram showing the time-varying quality of the same media item, FIG. 31 exhibits a first diagram showing the time-varying quality of different media items, FIG. 32a exhibits a second diagram showing the time-varying quality of different media items, FIG. 32b exhibits a third diagram showing the time-varying quality of different media items, FIG. 33 exhibits a fourth diagram showing the time-varying quality of different media items, FIG. 34 exhibits a fifth diagram showing the time-varying quality of different media items, FIG. 35 outlines a first sequence diagram showing the usage of the AMIL DOM data structure, FIG. 36 outlines a second sequence diagram showing possible modifications on the AMIL document.
Figure 38:
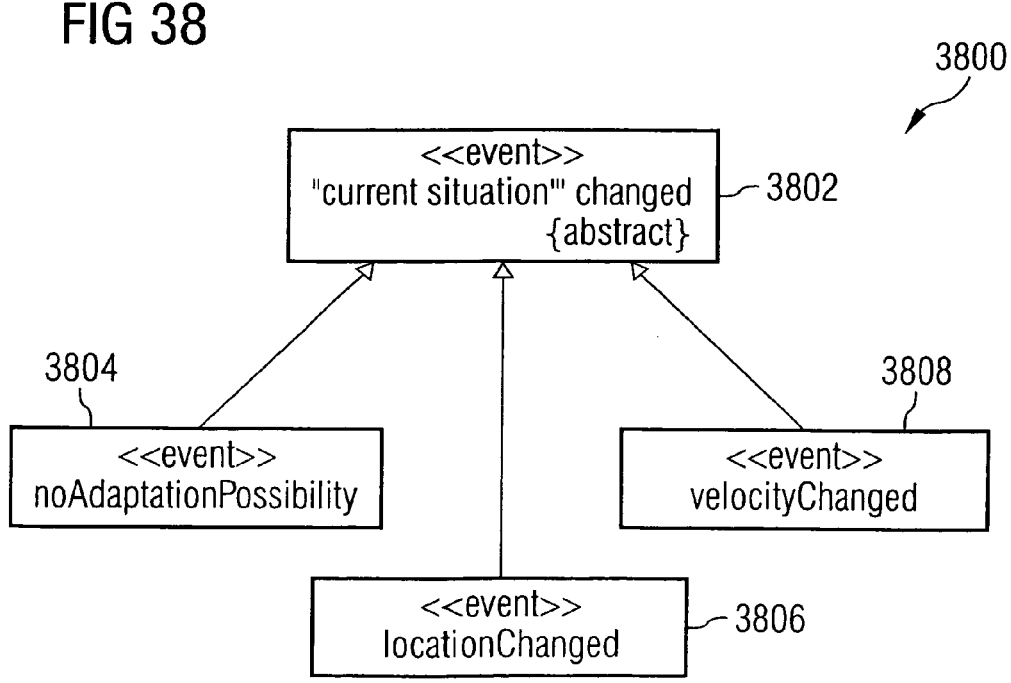
FIG. 38 presents a class diagram showing possible events in case the current situation has changed.

FIG. 38 shows some types of possible events 3802. In detail, each parameter, describing part of the "current situation", may be modeled as an event 3802. FIG. 24 shows the influence of an event 3802 to a specific instance of an AMIL Document. In case a) the internal linking structure of the document is changed, in case b) the essential hierarchical document structure and the internal linking 1600 are changed; this might result in a updated or totally different document.

Note:

a) By the time the invention has been made, the focus was on "modification of the linking structure". By contrast, "modification of the whole document" has not been considered so far. However, modification of the whole document is a quite interesting topic if the "conversational" and "document retrieval" scenario are considered together, It should be noted that, based on changes in the "current situation", the whole document structure might be changed.

The change of the "current situation" can be forwarded to the AMIL Browser (which is in charge of doing the document processing) in a way described in this section and the following subsection. But an event 3802 simply says that something has happened, more detailed information about the event 3802 is not passed. Therefore, if necessary, additional functionality 1800 has to be provided as part/extension to the XPath and XSLT specification for use in expressions. (As shown in the following subsection, XPath and XSLT are used for describing "conditional" expressions in an "action".)

FIG. 18 shows a conditional statement, which might be part of an action element. The function "diff" is an extension which is used to describe that the content of the test element should be evaluated if the difference between the "currentlocation" and the location at the point ("47,11","9,34") (which denotes longitude and latitude, respectively) is less than 500 meters.

The Events Module 118 supported by AMIL allows acting on changes of the "current situation". The module itself is optional and has not to be supported.

"adaptationevent" element:
The "adaptationevent" element is the outermost element of the Adaptation Events Module 118. It logically serves as a container for the adaptation events description 700 used in an AMIL document 2402.

"id" attribute:
It is used according to XML as an identifier for referencing the whole Adaptation Possibilities Description Module.

"listener" element 3906:
The "listener" element realizes a binding of an event 3802 to a specific action, which is the only child a listener have.

"type" attribute:
The attribute "type" specifies which event 3802 the listener 3906 is listening for. It is simply an identifier, reflecting that a property of a specific sensor has changed. There is no additional information available which is associated with the event 3802.

Note:
a) The set of supported events 3802 is described in the XML Schema "EventType" as an enumeration. This should not scare of defining additional event 3802 types. The "EventType" is defined in XML Schema and can domain-specifically be extended.
b) The (namespace-specific) attribute value has to be conform to the following pattern: "sensor"::"name of the event"

Thereby, the sensor specifies the source of the event 3802, and the name specifies the kind of the event 3802. The pattern is required, and the validation process checks the rule.

"action" element 3910:
The "action" element 3910 describes the activity as a result to an event 3802. The content of the element consists of "conditional" and "action" statements (e.g. the "link" statement). Due to the fact that a vocabulary for expressing conditional statements is already available in XSLT, it is taken over and integrated into the Events Module 118. This means that statements applied to the document (e.g. the "link" statement) can either be used in an conditional statement, to consider the change of the "current situation" in more detail, or directly. FIG. 19 shows an exemplary document fragment of an adaptation event description 1900/2000 using XSLT's conditional statements. FIG. 20 depicts a document fragment describing an action without the usage of XSLT's conditional statements.

"link" element 3914:
The "link" element 3914 changes the linking structure of a document. It replaces the link described in the attribute "element".

Note: This attribute is of type "IDREF", which means that their existence is validated during reading the AMIL document 2402.

"element" attribute:
Specifies the element, by its unique "id", which has a link to be modified.

"source" element 3916:
The "source" element 3916 specifies the source of the link.

"ref" attribute:
It specifies the name of the attribute, and which value has to be modified. The attribute itself is the source of the link.

"target" element 3918:
The "target" element 3918 specifies the new target of the link.

"ref" attribute:
It specifies the new link target.

Example: If in the following code fragment the link between the media item 304, uniquely addressed by the attribute "id", and the region 502, uniquely addressed by the attribute "id",

```
<region id="regionA" .../>
<region id="regionB" .../>
<mediaitem id="mediaitemA" region="regionA">
``` should be modified, the "source" element 3916 and the "target" element 3918 have to be written as follows:

```
<link element="mediaitem">
    <source ref="region" 502/>
    <target ref="regionB">
</link>
```

This results in that the mediaitem's visual component uses the "regionB" instead of the "regionA". The exact behavior of the media's visual components depends on the region's attribute "fit".

2. Constraints Module

The Constraints Module 116 allows adding additional constraints 802 to the adaptation description elements to influence (in most cases to reduce) the set of possible adaptation alternatives 2100. When constraints 802 are applied, it is e.g. possible to remove all adaptation alternatives 2100 (each consisting of different media items 304) that need a higher "bit rate" than specified by the respective constraint 802.

Thereby, it is useful to allow such constrains also for the "mediatiem" element 304 in spite of the fact that there are no alternatives on this level. This is because a media item 304 may be able to run in different media configurations. A media item 304 may expose different media configurations, which can dynamically be selected when playing the media item 304. Each media configuration may result in different media properties like different quality, resource requirements or error robustness. Examples for such media items 304 are video streams using a layered codec, a live stream whose coding parameters can be influenced from the receiver side or media items 304 that can dynamically apply Forward Error Correction (FEC) algorithms. When constraints 802 are used, the author has the possibility to exclude unwanted media configurations.

It is important to understand the difference of the semantics between a constraint 802 applied to a media item 304 and another adaptation description element. When applied to a media item 304, it restricts the possible media item configurations. When applied to an adaptation description element (e.g. like "choose" 704), it applies to all possible adaptation possibilities 1500 of that element (each consisting of a set of media items 304). In the is AMIL code depicted in FIG. 21, the outermost "par" has at least four adaptation alternatives 2100 (m1 AND m3, m1 AND m4, m2 AND m3, m2 AND m4). If the media items 304 allow different media configurations, the list is further extended as two alternatives either differ in one media item 304 or one media configuration.

A constraint 802 applied to this "par" element 702 could remove one or more of these alternatives. For example, a constraint "bitrate<500 kBit/s" would remove all alternatives whose media-items-combined bit rate is higher.

The author has to take care that the constraints 802 are consistent and do not result in a situation, where all adaptation alternatives 2100 are removed.

In the following section, the "Constraint Module" 800 supported by AMIL language shall be introduced.

"constraints" element 801:
  The "constraints" element 801 is the outermost element of the Constraint Module. It logically serves as a container for all "constraint" elements 801 used in the AMIL document 2402.
  "id" attribute:
    It is used according to XML as an identifier for referencing the whole "Constraint Module" 800.
"constraint" element 802:
  The "constraint" element 802 is a container for several "restriction" elements 804, "adaptationtrigger" elements 806 and/or "adaptationfrequency" elements 808. It can be referenced by other elements that want to apply the defined constraint 802.
  "id" attribute:
    Used according to XML as an identifier for referencing the whole "constraint" 802.
"restriction" element 804:
  The "restriction" element 804 is used for describing the actual restrictions imposed by a constraint 802.
  "value" attribute:
    The "value" attribute contains a textual description 700 of the actual restriction. Ist value consists of different conditions. A condition itself consists of a "restriction identifier" followed by a comparison operator, followed by a value plus optionally a unit (example: "bandwidth<500 kBit/s"). Conditions can be combined using the "AND" operator or the "OR" operator. The restriction identifier determines the possible comparison operators, the value range and the unit. FIG. 11 depicts the supported restriction identifier.

The advantage of having this data in an attribute value and not in several XML elements or attributes is that additional restriction identifiers can be added later on without the need to change the AMIL grammar.

"adaptationtrigger" element 806:
  The "adaptationtrigger" element 806 is used for describing conditions where a media item 304 is considered to have a problem and therefore an adaptation should be performed if the condition becomes true.
  It is important to note the difference between a "restriction" 804 and an "adaptationtrigger" 806. Whereas a "restriction" 804 limits the number of possible adaptation alternatives 2100, an "adaptationtrigger" defines conditions that should not occur during the playtime of a media item 304.
  "value" attribute:
    The value attribute contains a textual description 700 of the actual adaptation trigger. Its value is always a string consisting of different conditions. A condition consists of a condition identifier followed by a comparison operator, followed by a value plus optionally a unit (example: "framerate<15 frames/s"). Conditions can be combined using the "AND" operator or the "OR" operator. The identifier determines the possible comparison operators, the value range and the unit.
    FIG. 12 shows the supported "Adaptation Trigger Identifier".
    To evaluate the adaptation triggers, the AMIL player needs a means to measure the corresponding values during playtime of the media item 304. If the AMIL player does not have a possibility to measure a certain value or the specified condition does not apply to the media item's type, the corresponding adaptation trigger is ignored.
    The advantage of having this data in an attribute value and not in several XML elements or attributes is that additional restriction identifiers can be added later on without the need to change the AMIL grammar.
"adaptationfrequency" element 808:
  The element "adaptationfrequency" 808 is used for describing how often adaptations should occur. Adaptations are always necessary if the situation gets worse. If the situation improves, different strategies can be applied which determine how fast to react. This results in either a more "stable" adaptation behavior or an "agile" adaptation behavior. This behavior can be influenced using this element.
  The element "adaptationfrequency" 808 does not have a meaning if associated to a "mediaitem" element 304 or another element, which does not have any adaptation possibilities 1500. An "adaptationfrequency" element 808, which is associated to an adaptation description element, overwrites all other "adaptationfrequency" elements 808 which are associated to elements inside this adaptation description element.
  The defined adaptation frequency always applies to all adaptation alternatives 2100 of the adaptation description 2900 element it is assigned to. Therefore, one part of the adaptation description 2900 can be set to react "agile" and another part to react "stable". The adaptation algorithm will then try to select adaptation possibilities 1500 during runtime, in which the "agile" parts are changed more often than the "stable" parts.

"value" attribute:
   This attribute specifies how the adaptation behavior should be. The possible values are "stable", "moderate" and "agile"

FIG. 11 gives an overview of the restriction identifiers contained in the "value" attribute of the "restriction" element 804. Possible comparison operators are: <, >, <=, >=.

FIG. 12 gives an overview of the adaptation trigger identifiers included in the "value" attribute of the "adaptationtrigger" element 806. Possible comparison operators are: <, >, <=, and >=.

The invention claimed is:

1. A method for describing adaptive mobile multimedia applications or presentations, whose playback behavior depends on a current quality of service (QoS) during playback, in an XML-based document that is interpreted by an entity playing back multimedia content, the method comprising:
   describing, in the document, intrinsic adaptation possibilities of application or presentations, which run in a mobile network environment, in an Adaptation Module including a programming language structure required for describing the adaptation possibilities of said adaptive mobile applications;
   playing back an initial continuous media item during the current QoS; specifying, in the document, alternative media items to be reproduced when a change in the current QoS during playback prevents the initial continuous media from being played back, said alternative media items being specified with a choose element having a startmode attribute which specifies a playtime at which reproduction is started for a continuous media item of the alternative media items after an adaption to the change in the current QoS; and
   after adaption to the change in the current QoS, playing back the continuous media item of the alternative media items according to the startmode attribute instead of the initial continuous media item.

2. The method according to claim 1, comprising:
   describing interaction parameters of the application or presentation in an Interactions Module including the programming language structure required for describing interaction possibilities used for said adaptive mobile applications.

3. The method according to claim 1, further comprising:
   describing constraints of an adaptation process in a Constraints Module including the programming language structure required for describing constraints for said adaptive mobile application.

4. The method according to claim 1, further comprising:
   changing the programming language structure of modules in an Events Module including the programming language structure required for describing event possibilities used in said mobile applications.

5. The method according to claim 1, further comprising:
   describing an association between the Adaptation Module and a MediaItems Module, represented by a link.

6. The method according to claim 1, further comprising:
   describing an association between the Adaptation Module and an Interactions Module, represented by a link.

7. The method as described in claim 1, wherein the programming language comprises:
   at least one MediaItems Module serving as a description unit for the alternative media items within said multimedia applications,
   at least one Layout Module which organizes said alternative media items into regions on the visual rendering surface of a mobile display device, and
   the Adaptation Module controls a context-aware adaptation of distributed multimedia applications by referencing elements of the MediaItems Module.

8. The method according to claim 7, wherein the programming language further comprises:
   at least one Constraints Module which allows adding additional constraints to adaptation description elements, and
   at least one Events Module which allows for a reaction on changes of various resources encompassing user's physical environment, user's context, quality-of-service (QoS) conditions of the applied networks, and mobile device capabilities.

9. A method for operating a middleware framework supporting processing of an XML-based description of an adaptive mobile application or presentation according to claim 7, wherein said middleware framework allows each running mobile multimedia application to specify media each running mobile multimedia application wants to use and relationships between these media, calculates adaptation possibilities of mobile multimedia applications and controls an adaptation process.

10. The method according to claim 9, further comprising modifying a linking structure between the Adaptation Module and the MediaItems Module when the current QoS has changed.

11. The method according to claim 9, further comprising modifying a linking structure between the MediaItems Module and the Layout Module when the current QoS has changed.

12. The method according to claims 9, further comprising modifying a linking structure between the Interactions Module and the Layout Module when the current QoS has changed.

13. The method according to claims 9, further comprising modifying at least one of a document linking structure and a document structure by user interactions.

14. The method according to claim 13, wherein the user interactions are described by an Interactions Module.

15. The method according to claim 9, further comprising:
   dynamically binding media items to a specific region on a visual rendering surface of the mobile display device, said binding being initiated by changes of the current QoS.

16. The method according to claim 10, further comprising:
   dynamically binding widgets to a specific region on a visual rendering surface of the mobile display device, said binding being initiated by changes of the current QoS.

17. The method according to claim 7, further comprising:
   extending or newly specifying at least one attribute of at least one element of the Layout Module in order to adapt a visual component of a specific media item to dimension of those regions on the mobile display device which are intended for multimedia presentations by scaling a visual size of said specific media item or replacing the said specific media item.

18. The method according to claim 5, further comprising: describing the alternative media items of the MediaItems Module used in the Adaptation Module by media-specific information encompassing bandwidth and size of the visual portion of a multimedia presentation, meta information encompassing a name, genre, and actor of the alternative media items or Universal Resource Identifiers (URIs).

19. The method according to claim 1, further comprising continuously monitoring network conditions, and selecting one of the alternative media items when the current QoS changes.

20. The method according to claim 19, wherein the selecting includes using priority attributes of the alternative media items.

21. The method according to claim 20, further comprising using a Par Element of the Adaptation Module for defining a simple time grouping in which multiple elements must be played back at a same time.

22. The method according to claim 21, wherein the adaptation possibilities are calculated with a Boolean term expressed by a Disjunctive Normal Form (DNF) on a set of different media items, wherein the choose element is considered as an OR operator and a par element as an AND operator, from which one conjunction of the Disjunctive Normal Form (DNF), and the adaptation possibility, is selected, depending on the QoS, mobile device capabilities and user context.

23. The method according to claim 1, wherein the start-mode attribute can take one of the following values:
  a restart value, which indicates that the media item should always start from the beginning,
  a resume default value, which indicates that the media items should always start from the position it stopped,
  a laststop value, which indicates that the media item should always start at the media time the last continuous media item contained in the same choose element stopped,
  a playtime value, which indicates that the media item should always start at the time, which is the combined playtime of all media items contained in the choose element since the choose element is started, and
  a contplaytime value, which indicates that the media item should always start at the time, which is the combined playtime of all continuous media items contained in the choose element since the choose element is started.

24. The method according to claim 23, wherein the Adaptation Module supplies the choose element with an onremove attribute specifying what happens after a continuous media item is played back.

25. The method according to claim 24, wherein the Adaptation Module provides the choose element with an evaluation attribute which specifies if a content model of an element choose is evaluated once at start-up time, repeatedly in a specific time period or continuously while playing back the multimedia presentation.

26. The method according to claim 24, wherein the Adaptation Module provides the choose element with an empty attribute which supports a functionality that a set of media appropriate for the current QoS can be empty.

27. The method according to claim 26, further comprising evaluating an associated priority of an adaptation possibility by sorting all children of a par element according to their priority, merging configurations of a first two child elements by an AND operator in such a way that priority of resulting configurations includes a priority of a higher prioritized child appended with a priority of a lower-prioritized child, and repeatedly merging a result with all other children of the par element.

* * * * *